(12) United States Patent
Fatehi et al.

(10) Patent No.: US 6,597,481 B1
(45) Date of Patent: Jul. 22, 2003

(54) CONTROLLABLE WAVELENGTH-SELECTIVE OPTICAL CROSS-CONNECT

(75) Inventors: Mohammed Taghi Fatehi, Middletown, NJ (US); Sungho Jin, Millington, NJ (US); Wayne Harvey Knox, Holmdel, NJ (US); Hareesh Mavoori, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/271,642

(22) Filed: Mar. 18, 1999

Related U.S. Application Data

(60) Provisional application No. 60/120,697, filed on Feb. 19, 1999.

(51) Int. Cl.[7] .............................................. H04J 14/02
(52) U.S. Cl. ...................... 359/128; 359/130; 359/124; 359/127
(58) Field of Search ................................ 359/128, 130, 359/124, 127

(56) References Cited

U.S. PATENT DOCUMENTS

| | | | | |
|---|---|---|---|---|
| 4,912,526 A | * | 3/1990 | Iwaoka et al. | 359/124 |
| 5,007,705 A | * | 4/1991 | Morey et al. | 385/12 |
| 5,026,138 A | * | 6/1991 | Boudreau et al. | 385/51 |
| 5,140,655 A | * | 8/1992 | Bergmann | 385/42 |
| 5,214,728 A | * | 5/1993 | Shigematsu et al. | 359/24 |
| 5,446,809 A | * | 8/1995 | Fritz et al. | 359/128 |
| 5,570,218 A | * | 10/1996 | Sotom | 359/117 |
| 5,673,129 A | * | 9/1997 | Mizrahi | 359/124 |
| 5,754,320 A | * | 5/1998 | Watanabe et al. | 359/117 |
| 5,790,300 A | * | 8/1998 | Zediker et al. | 359/334 |
| 5,835,259 A | * | 11/1998 | Kakui et al. | 359/341 |
| 5,870,216 A | * | 2/1999 | Brock et al. | 359/172 |
| 5,966,233 A | * | 10/1999 | Fujiwara et al. | 359/240 |
| 5,973,808 A | * | 10/1999 | Sekimura et al. | 359/124 |
| 5,982,791 A | * | 11/1999 | Sorin et al. | 359/247 |
| 6,020,986 A | * | 2/2000 | Ball | 359/130 |
| 6,055,348 A | * | 4/2000 | Jin et al. | 385/37 |
| 6,166,838 A | * | 11/2000 | Liu et al. | 359/128 |
| 6,192,172 B1 | * | 2/2001 | Fatehi et al. | 385/17 |
| 6,281,998 B1 | * | 8/2001 | Jones et al. | 359/130 |
| 6,288,810 B1 | * | 9/2001 | Grasso et al. | 359/127 |
| 6,304,351 B1 | * | 10/2001 | Pedersen | 359/128 |

* cited by examiner

*Primary Examiner*—Leslie Pascal
*Assistant Examiner*—David C. Payne
(74) *Attorney, Agent, or Firm*—Lowenstein Sandler, PC

(57) ABSTRACT

In accordance with the invention, an optical cross-connect switch includes an optical router for distributing multi-wavelength optical input signals, an optical combiner for supplying multi-wavelength signals at the output ports of the switch, and optical fibers for interconnecting the optical router and optical combiner. Selected interconnecting optical fibers include controllable wavelength-selective elements, such as magnetically controllable fiber gratings, which are capable of transmitting or reflecting individual channels within the multi-wavelength optical signals so that a selected channel of a particular wavelength can be routed from any of the input ports to any of the output ports of the switch.

34 Claims, 14 Drawing Sheets

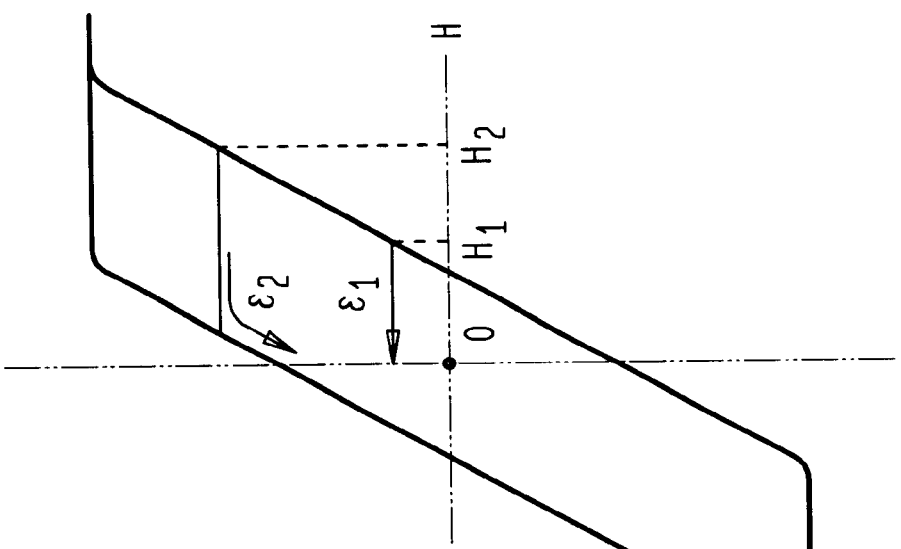
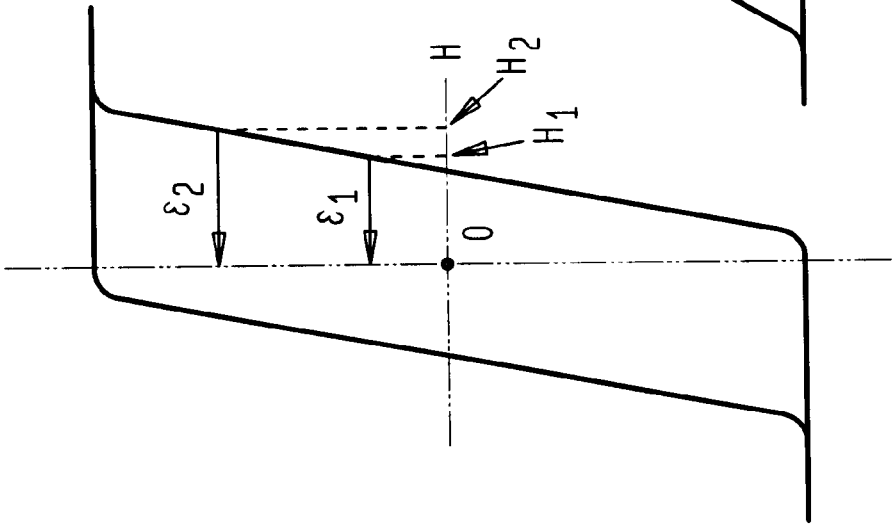
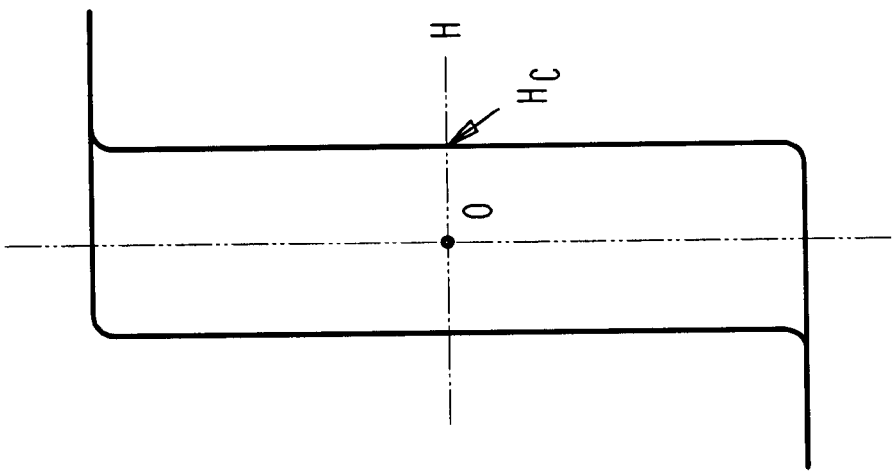

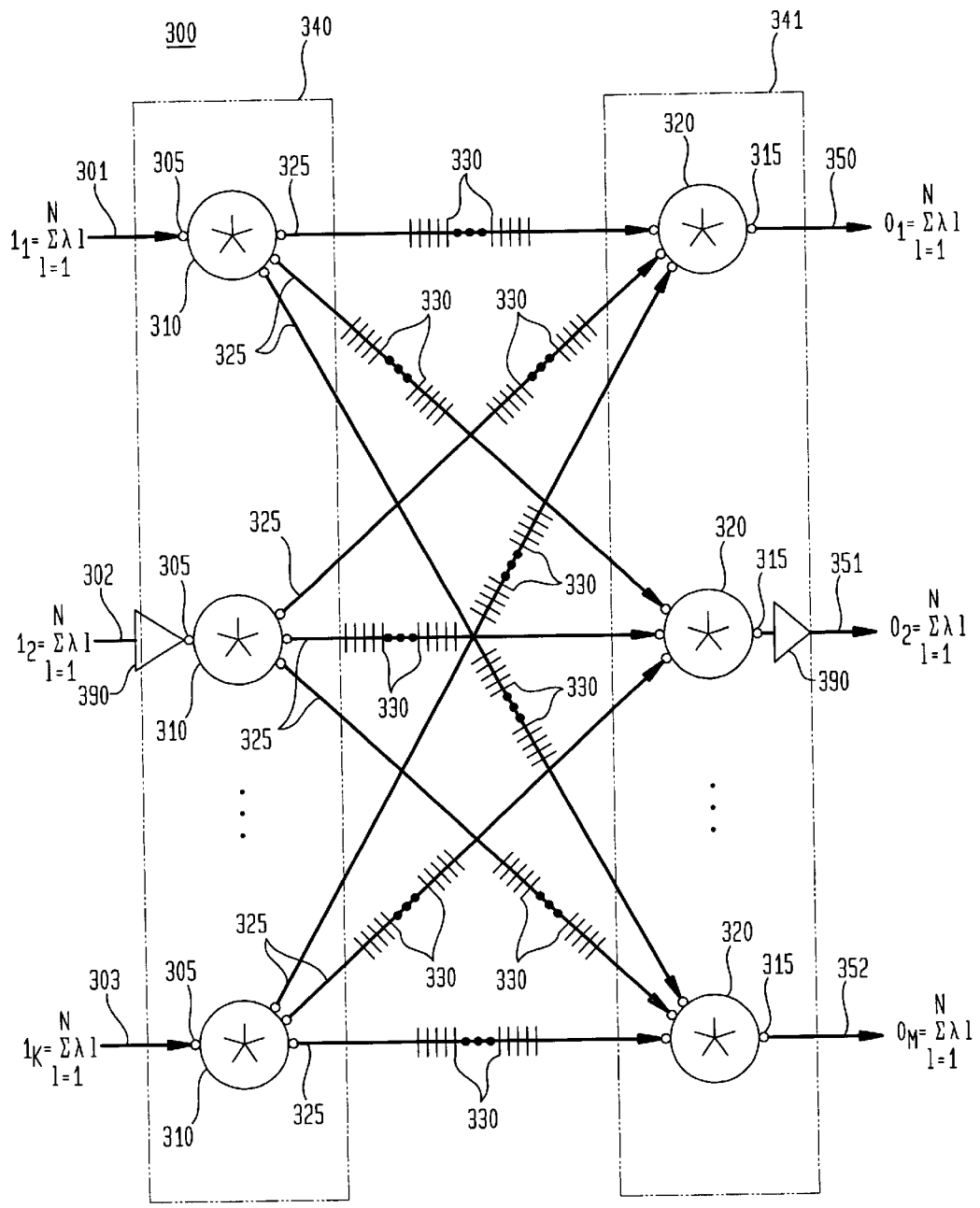

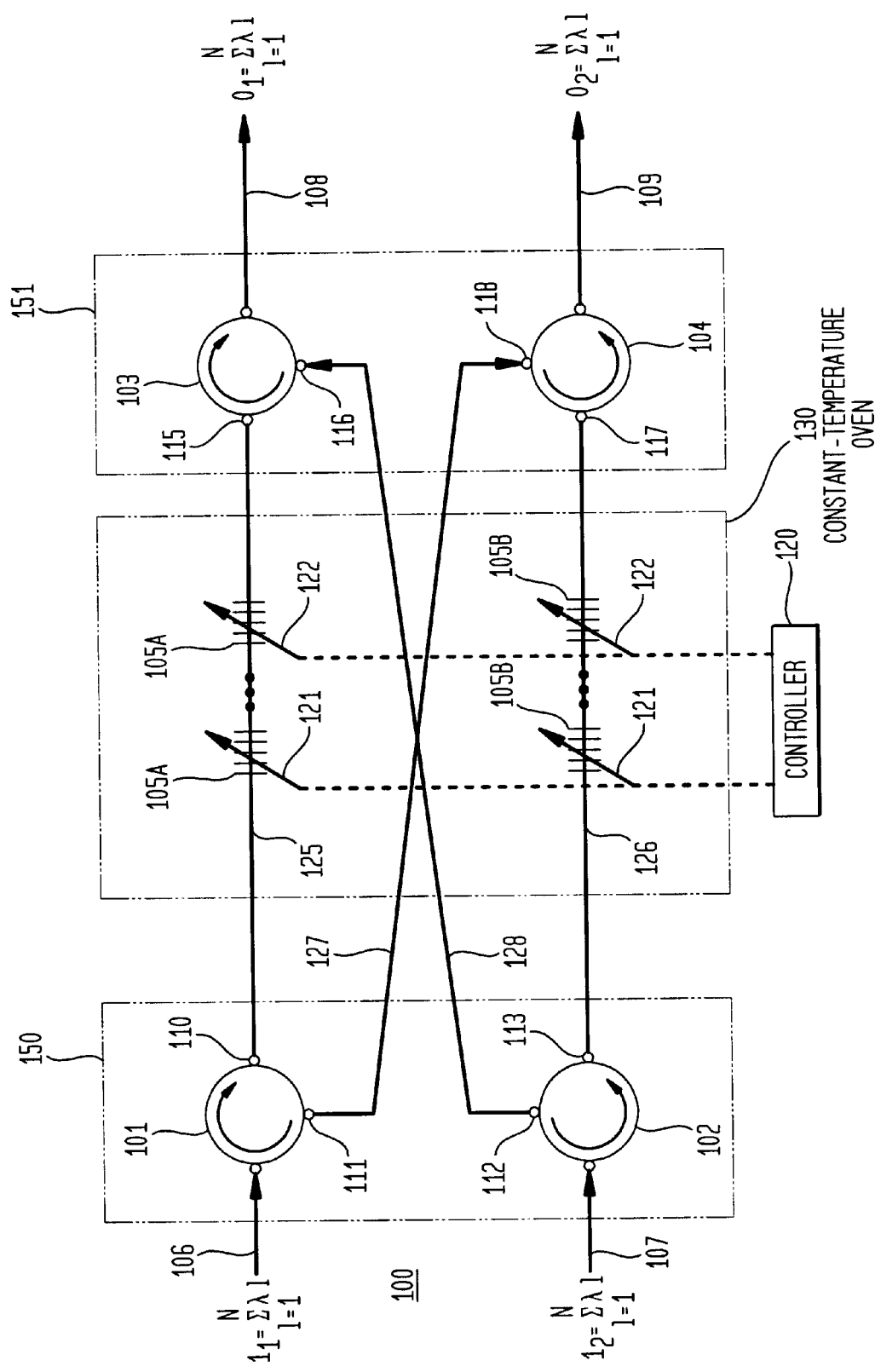

US 6,597,481 B1

CONTROLLABLE WAVELENGTH-SELECTIVE OPTICAL CROSS-CONNECT

CROSS REFERENCE TO RELATED APPLICATIONS

This application claims the benefit of U.S. Provisional application Serial No. 60/120,697 of identical title filed Feb. 19, 1999.

FIELD OF THE INVENTION

This invention relates to optical cross-connects for routing multi-wavelength optical signals, and, in particular, to magnetically controllable wavelength-selective optical cross-connects.

BACKGROUND OF THE INVENTION

In modern telecommunication networks, optical fiber is generally preferred as the transmission medium because of its high speed and wide bandwidth. Wavelength division multiplexing (WDM), which combines many optical signals at different wavelengths for transmission in a single optical fiber, is being used to meet the increasing demands for more speed and bandwidth.

In communication networks, such as those employing WDM, individual optical signals may need to be selectively routed to different destinations. A necessary component for selectively routing signals through interconnected nodes in a communication network is a high capacity matrix or cross-connect switch. At present, most cross-connect switches used in optical communication networks are either manual or electronic. Electronic switches require multiple optical-to-electrical and electrical-to-optical conversions. Because of the speed and bandwidth advantages associated with transmitting information in optical form, all-optical network elements are emerging as the preferred solutions for WDM-based optical networks. Moreover, all-optical network elements are needed to provide the flexibility for managing bandwidth at the optical layer (e.g., on a wavelength by wavelength basis).

Although efforts have been made to develop all-optical cross-connects and switches, these efforts have not kept pace with the ever increasing demands for more speed and bandwidth. For example, some cross-connect arrangements have contemplated a combination of lithium niobate (LiNbO$_3$) switch arrays with fiber amplifiers to address the speed and loss problems of prior systems. Although lithium niobate switch arrays provide fast switching capability and fiber amplifiers can compensate for the lossy characteristics of LiNbO$_3$, these types of cross-connects do not provide the necessary wavelength selectivity for effectively managing bandwidth. In another type of optical cross-connect arrangement, wavelength channels are rearranged according to common destinations using wavelength-changing elements. In particular, multi-wavelength optical signals are demultiplexed into individual optical signals of different wavelengths and the individual optical signals are switched using separate layers of spatial switch fabric corresponding to each of the different wavelengths. The use of demultiplexers and separate layers of switch fabric results in this type of cross-connect arrangement being costly and complex to implement. Similarly, other types of optical cross-connect arrangements using multiple stages of switch fabric are also known to be costly and complex.

SUMMARY OF THE INVENTION

In accordance with the invention, an optical cross-connect switch includes an optical router for distributing multi-wavelength optical input signals, an optical combiner for supplying multi-wavelength signals at the output ports of the switch, and optical fibers for interconnecting the optical router and optical combiner. Selected interconnecting optical fibers include controllable wavelength-selective elements, such as magnetically controllable fiber gratings, which are capable of transmitting or reflecting individual channels within the multi-wavelength optical signals so that a selected channel of a particular wavelength can be routed from any of the input ports to any of the output ports of the switch.

In one exemplary embodiment, the optical router portion includes a plurality of input optical couplers, wherein each input optical coupler is associated with a corresponding input port of the optical switch. Similarly, the optical combiner portion includes a plurality of output optical couplers, wherein each output optical coupler is associated with a corresponding output port of the optical switch. Each input optical coupler together with its associated fiber gratings on the interconnecting optical fibers is used for distributing the signals received via the input ports while each output optical coupler together with its associated fiber gratings is used for combining the signals to be supplied at the output ports of the switch. By controlling the transmissive and reflective operating modes of the fiber gratings, the fiber gratings can be used to facilitate the switching of individual channels of the multi-wavelength optical signals on a wavelength by wavelength basis.

The optical cross-connect switch does not require optical-to-electrical and electrical-to-optical conversions and, as a result, can realize the speed and bandwidth advantages associated with transmitting information solely in optical form. Moreover, by using a series of high-speed, magnetically tunable and latchable fiber gratings to facilitate the switching function, the optical switch has the necessary wavelength selectivity to optimally manage bandwidth at the optical layer, e.g., on a wavelength by wavelength basis. The optical switch is also less costly and less complex than the prior arrangements It operates fast and requires no power to maintain the switched state. Additionally, the switch can be assembled and packaged in such a way that the switch performance and the wavelength selectivity are not affected by the changes in ambient temperature.

BRIEF DESCRIPTION OF THE DRAWINGS

A more complete understanding of the principles of the invention may be obtained from consideration of the following detailed description in conjunction with the drawing, with like elements referenced with like reference numerals. In the drawing:

FIGS. 3(a)–(c) show square, optimally-skewed, and excessively-skewed M vs. H hysteresis loops respectively;

FIG. 9 is an illustrative embodiment of a K×M wavelength-selective optical cross-connect arrangement according to the principles of the invention;

It is to be understood that these drawings are for purposes of illustrating the concepts of the invention and, except for the graphs, are not to scale.

DETAILED DESCRIPTION OF THE INVENTION

This disclosure is divided into four parts. Part I describes an optical cross-connect switch in accordance with the invention. Part II describes the structure and operation of magnetically tunable gratings useful in such switches. Part III describes alternative embodiments of the inventive switch, and Part IV describes arrangements for packaging the switch.

I. The Optical Cross-connect Switch

Figure 1:
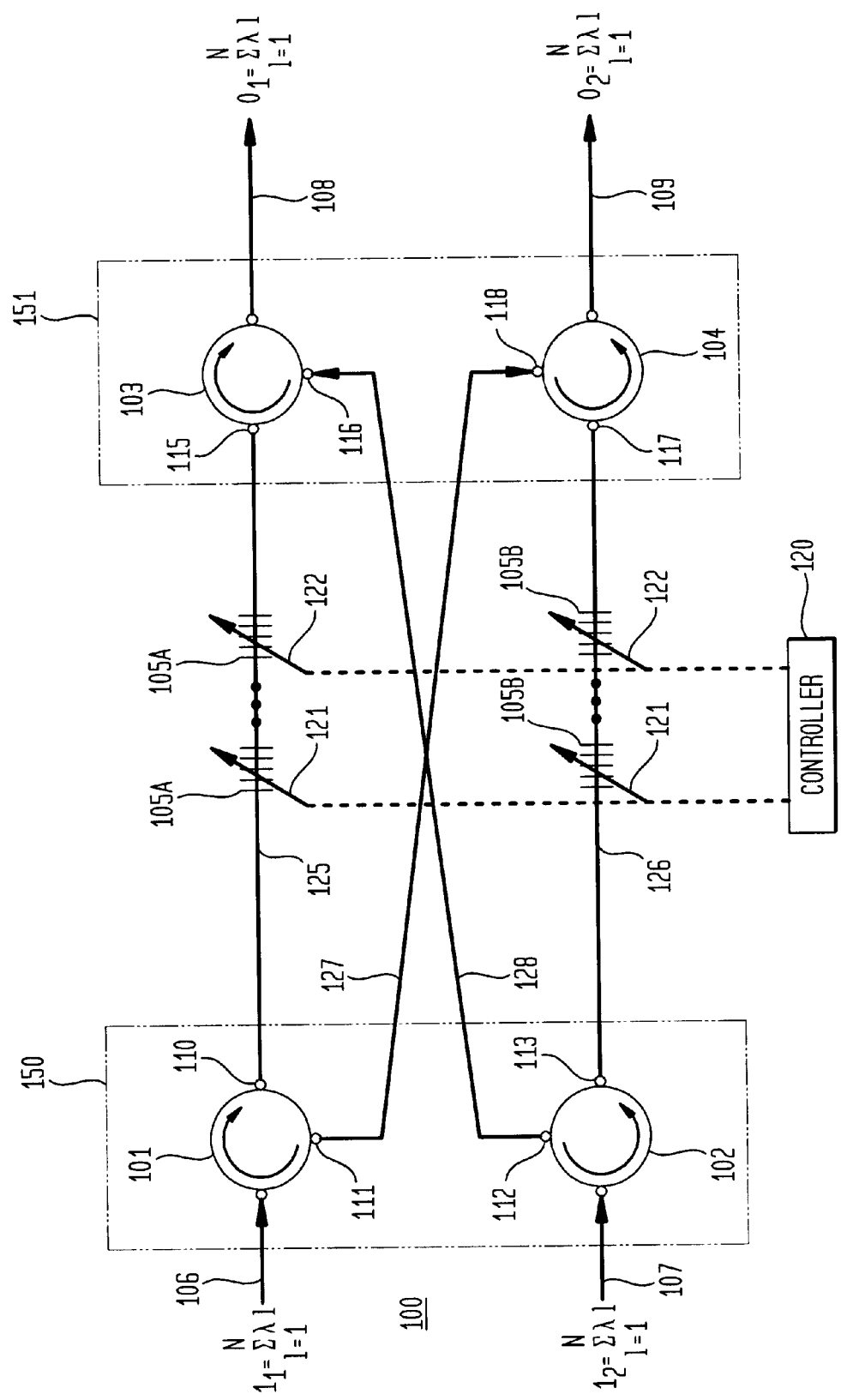
FIG. 1 is an illustrative embodiment of a 2×2 wavelength-selective optical switch according to the principles of the invention.

Referring to the drawings, FIG. 1 shows an exemplary embodiment of a 2×2 optical switch 100 which can switch individual channels of multi-wavelength optical signals such as wavelength division multiplexed (WDM) optical signals. In the example shown in FIG. 1, multi-wavelength signals $I_1$ and $I_2$, represented by $$\sum_{i=1}^{N} \lambda_i$$

each comprise N individual channels, wherein each individual channel is associated with one of N wavelengths. However, it should be noted that this configuration is only meant to be illustrative. For example, different wavelengths may be assigned to the individual channels of multi-wavelength signals $I_1$ and $I_2$.

Optical switch 100 comprises an optical router portion 150 and an optical combiner portion 151. Optical router portion 150, which includes directional optical transfer devices 101 and 102, distributes multi-wavelength optical input signals $I_1$ and $I_2$. Optical combiner portion 151, which includes directional optical transfer devices 103 and 104, combines multi-wavelength optical signals for output as output signals $O_1$ and $O_2$. More specifically, directional optical transfer devices 101 and 102 receive multi-wavelength optical input signals $I_1$ and $I_2$ via input optical fibers 106 and 107, respectively. Similarly, directional optical transfer devices 103 and 104 are coupled to output optical fibers 108 and 109, respectively, for supplying multi-wavelength optical output signals $O_1$ and $O_2$, respectively. Directional optical transfer devices 101–104 may comprise optical circulators which are well-known in the art or any other known devices capable of transferring or coupling optical energy in a directional manner. For simplicity of explanation, reference will be made hereinafter to optical circulators 101–104.

Optical circulators 101–104 are coupled together via interconnecting optical fibers 125–128, wherein optical fibers 125 and 126 are wavelength-selective optical fibers comprising wavelength-selective elements 105 disposed therein. Wavelength-selective elements 105 may comprise tunable fiber Bragg gratings which are well-known in the art or any other known wavelength-selective filters. For simplicity of explanation, reference will be made hereinafter to fiber gratings 105. As shown, optical fiber 125 includes fiber gratings 105A while optical fiber 126 includes fiber gratings 105B. As shown, port 110 of optical circulator 101 is coupled to port 115 of optical circulator 103 on a straight-through path via wavelength-selective optical fiber 125. Port 111 of optical circulator 101 is coupled to port 118 of optical circulator 104 on a cross-over path via optical fiber 127. Similarly, port 113 of optical circulator 102 is coupled to port 117 of optical circulator 104 on a straight-through path via wavelength-selective optical fiber 126. Port 112 of optical circulator 102 is also coupled to port 116 of optical circulator 103 on a cross-over path via optical fiber 128.

In contrast to prior optical switching and cross-connect systems, optical switch 100, according to the principles of the invention uses tunable fiber gratings to facilitate a wavelength-selective switching function. In particular, fiber gratings 105 can be tuned to reflect or transmit optical channels of any particular wavelength from the multi-wavelength optical input signals $I_1$ and $I_2$. In one example, fiber gratings 105 can be tuned or otherwise programmed so that at least one fiber grating 105 is used for each particular wavelength that is to be routed from an input to an output of optical switch 100. Fiber gratings 105 can operate as either band reflection filters or band pass filters. As band reflection filters, fiber gratings 105 can be used to reflect any particular wavelength or wavelengths in the multi-wavelength optical signal. In contrast, as band pass filters, fiber gratings 105 can be used to pass any particular wavelength or wavelengths.

Methods for adapting fiber gratings using fabrication techniques or other tuning/programming techniques are well known. In the embodiments described herein, fiber gratings 105 can be spliced into the fiber path, etched directly on the fiber, or incorporated by other known methods. For additional background information on the use of fiber gratings as wavelength-selective components, see, for example, Hubner et al., *Strong Bragg Gratings in Non Sensitized Low Loss Planar Waveguides as Building Blocks for WDM Network Components*, SPIE Vol. 2998, No. 12, Photonics West 97, San Jose, Calif., 1997.

In operation, optical switch 100 employs wavelength-selective add/drop principles to perform the equivalent switching function of a traditional cross-bar switch. More specifically, a multi-wavelength optical signal comprising individual channels each having a particular wavelength is provided as input $I_1$ to optical circulator 101 from optical fiber 106. Optical circulator 101 transfers the multi-wavelength optical signal onto wavelength-selective path 125 via port 110 of optical circulator 101. Those individual channels having wavelengths that are in the transmissive band of fiber gratings 105A are transmitted as a "through" connection to port 115 of optical circulator 103 and are supplied as part of multi-wavelength output signal $O_1$. This "through" routing would be the functional equivalent of the bar state of a cross-bar switch. Those wavelength channels having wavelengths that are in the reflection band of fiber gratings 105A are reflected back to port 110 of optical circulator 101. These channels are then routed from port 111 of optical circulator 101 to port 118 of optical circulator 104 via cross-over optical fiber 127 and are supplied as part of multi-wavelength output signal $O_2$. In effect, fiber gratings 105A are used to assist in cross-connecting these reflected channels in the same way that signals are cross-connected in the cross state of a cross-bar switch. The same principles of operation apply to optical signal 12 entering optical circulator 102 and will not be repeated here for reasons of brevity.

As shown, it is contemplated that selected ones of fiber gratings 105 can be controlled to facilitate the appropriate "through" routing and "cross-connect" routing of individual channels within the multi-wavelength optical signals. FIG. 1 shows one possible control implementation whereby fiber gratings 105 are controlled by a single controller 120 using a configuration of ganged switches 121–122. In particular, switch 121 may be used to simultaneously control a fiber grating 105A from optical fiber 125 and a fiber grating 105B from optical fiber 126, while switch 122 may be used to simultaneously control another fiber grating 105A from optical fiber 125 and another fiber grating 105B from optical fiber 126, and so on. In the example where the same wavelengths may be used for channels in both multi-wavelength optical signals $I_1$ and $I_2$, the control scheme could be advantageously used to ensure that corresponding wavelength channels carried in each optical fiber are synchronously switched to avoid interference between any two channels having the same wavelength in the same optical fiber.

Tunable fiber gratings 105 may be individually addressed and then controlled as appropriate (i.e., individually controllable). Appropriate control measures may include each fiber grating being individually tuned (or programmed) or individually and selectively switched between its transmissive and reflective operational states (e.g., to achieve an ON/OFF effect) using techniques well known to those skilled in the art. Specifically, the gratings can be tuned thermally, piezoelectrically, magnetostrictively (see U.S. Pat. No. 5,812,711 issued to A. M. Glass et al. on Sep. 22, 1998) or magnetically (see U.S. Pat. No. 5,781,677 issued to S. Jin et al. on Jul. 14, 1998). Of these techniques, magnetic tuning is believed most advantageous for this application.

II. Magnetically Tunable Fiber Gratings for the Switch

Figure 2:
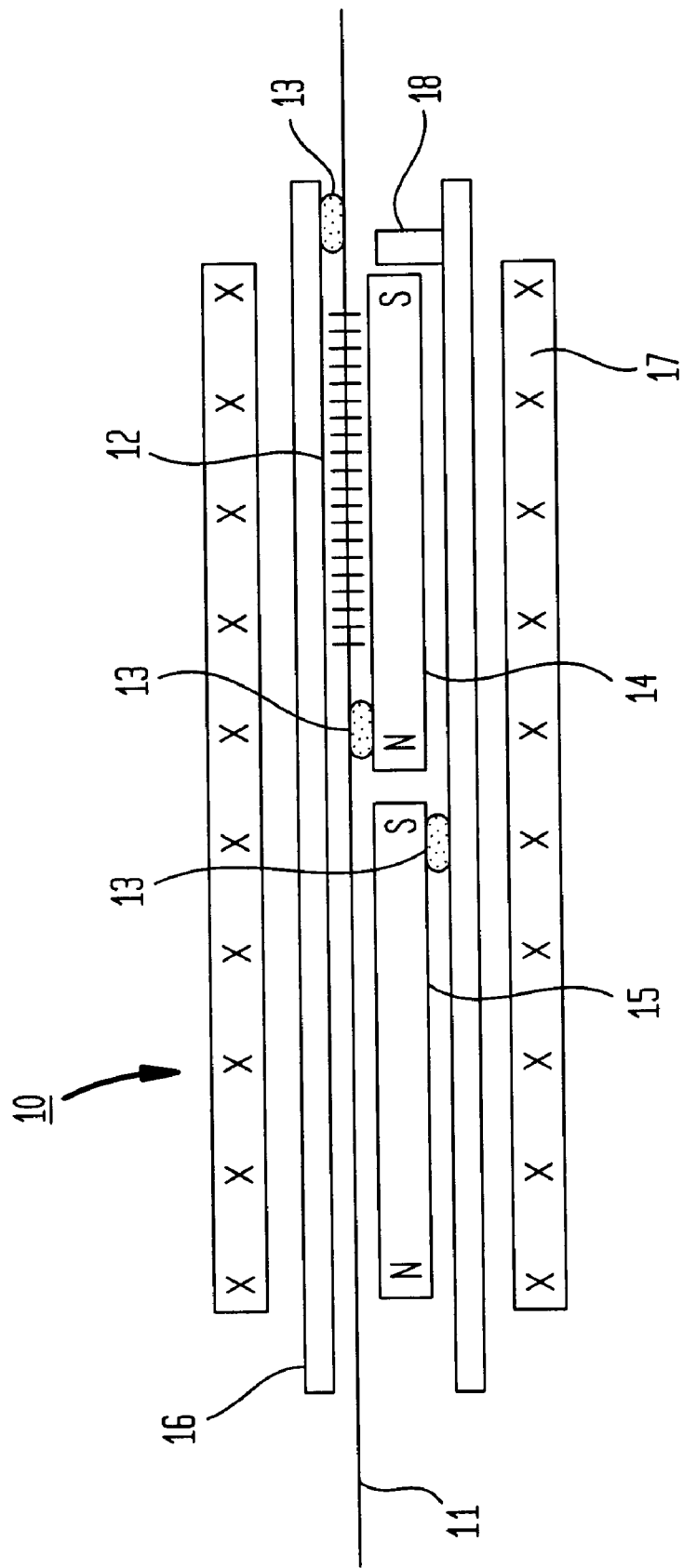
FIG. 2 schematically illustrates an exemplary magnetically tunable fiber grating device that is continuously tunable and latchable at several values of wavelengths.

Referring to the drawings, FIG. 2 schematically illustrates an exemplary reconfigurable fiber grating device 10 comprising a length of optical fiber 11 including a grating 12 of index perturbations. The fiber in the region of the grating is secured, as by bonds 13 or mechanical attachment, between a programmable magnet 14 and the guiding container 16 for transmitting magnetic force from the magnet 14 to the grating 12. A second magnet 15, bonded to container 16, is provided for applying force to magnet 14. The magnets can have guided cylindrical shape, but non-round cross-sectional shapes are preferred in order to minimize fiber twisting during handling or service. One or more electromagnets (solenoids) 17 are disposed adjacent the magnets for providing a controllable magnetic field between them. The guiding container 16 is preferably a tube but can also have other configurations, e.g., it can comprise a two-part assembly with u-shaped bottom and top pieces.

The guiding container 16 is typically a tube made of glass, quartz, metal or plastic. The fiber grating is attached to magnet 14 and the guiding container 16 either by mechanical clamping or by bonds, as with epoxy or solder. In the use of solder, the fiber surface is desirably coated with a metal layer to improve solder bond strength. Here the adhesive is shown as bond 13.

As illustrated in FIG. 2, magnets 14, 15 are aligned with a small air gap between them. They are preferably oriented so that opposite poles are adjacent (S adjacent N) and the field from electromagnet 17 will produce a tensile strain on the grating. The magnet 14 that is not bonded onto the guiding container 16 is advantageously constrained, as by a stop 18. In order to eliminate the thermal expansion related change of magnet length (magnet 15) and resulting change of the gap between the magnets, and hence change of the magnetic force and fiber strain, the magnet-container bonding location is chosen to be as close to the air gap as possible, with the bond-to-gap distance being less than 5%, preferably less than 2% of the magnet length.

In operation, the force transmitted from the magnets 14, 15, and 17 to the grating produces a strain which changes the wavelength response of the grating. The force between two attracting magnets is approximately proportional to the square of the magnetic induction (M) multiplied by the cross-sectional area (A) of the magnets at the gap (F $M^2 \cdot A$). Thus stronger magnets (higher M) or larger magnets (larger A) give stronger force. However, strong magnets with high coercivity are difficult to program or tune. When the fiber grating is stretched or compressed, e.g., 1% in length ($\epsilon = \Delta l/l = 0.01$), the grating periodicity $\Lambda$ will also change. However, the resonating Bragg reflection wavelength $\lambda$ will not change by exactly 1%, since the interatomic distance in the glass is also affected by the elastic strain and as a result the refractive index n is altered. This strain effect on the refractive index can be represented by a photoelastic constant $P_e$ which is typically about 0.22 for the $SiO_2$ fiber. The wavelength change induced by the magnetically applied strain $\epsilon(\epsilon = \Delta l/l)$ is thus expressed as $\Delta\lambda/\lambda = (\Delta l/l)(1-P_e) = \epsilon(1-P_e)$. The strain $\epsilon$ is determined by the applied stress ($\sigma$) and the elastic modulus (E), $\epsilon = \sigma/E$, and the stress on the fiber is the force (F) divided by the cross-sectional area ($\pi r^2$) where r is the radius of the fiber grating. Rearranging these equations, $\Delta\lambda/\lambda = (F/\pi r^2)(1/E)(1-P_e)$. For example, for $\lambda = 1550$ nm, F=1200 gm gives a shift in wavelength $\Delta\lambda = 16.01$ nm or about 1% change. For a wavelength-division-multiplex channel spacing of 0.8 nm, this induced $\Delta\lambda$ is sufficient to alter the filtered wavelength over a 20 channel span.

Since optical fiber tends to break at a tensile strain of less than about 6%, and since such a failure would be disastrous, it is highly desirable to have a tunable grating design that automatically provides an upper limit in total tensile strain. The assembly configuration of FIG. 2 offers such an advantage because the pre-set gap between the two magnets serves as the upper limit. When the fiber is stretched by magnetic force and the magnets eventually touch each other, the tensile elongation of the fiber can not proceed. The desired length of the gap between the two magnets in FIG. 2 (the upper limit in fiber elongation) is typically less than 4% of the fiber length being stretched (e.g., for 2" long fiber containing the grating, the gap is set below ~80 mil), and preferably less than 2% of the length of the grating-containing fiber. The latter value is equivalent to about one-third of the fiber breaking strain.

It is also important to make sure that the fiber grating is not subjected to a torsional deformation, as torsion reduces the fiber breaking strength for a given tensile strain and may distort optical signals. To eliminate or reduce torsional deformation, guiding mechanisms are provided for the magnets, either by adding guide rails in the case of circular cross-sectioned container or by using a non-circular container so that the mobile magnet moves without sideway rotation.

FIGS. 3a, 3b, and 3c qualitatively illustrate M vs. H hysteresis loops for three different types of magnets pertinent to the invention. An important advantage of the reconfigurable grating device is that continuous power is not required to maintain the induced change in grating periodicity and hence the induced wavelength shift. This is possible because of the latchability of magnetic force in the square loop magnets 14,15. The device can be bistably tuned between two wavelengths. A magnetic material with strong anisotropy and an axis of magnetization aligned parallel to the optical fiber axis has a square hysteresis loop as shown in FIG. 3a. See Jin et al., IEEE Trans. Magn., MAG-23, No. 5, p. 3187 (1987), which is incorporated herein by reference. The use of deformation aged Fe-Cr-Co alloys is preferred for magnets exhibiting such a loop shape.

With magnets exhibiting a square hysteresis loop, one can make bistable strain devices that switch between two wavelengths: e.g., a zero strain Bragg reflection wavelength $\lambda_0$ and a saturation-strained reflection wavelength $\lambda_1$. $\lambda_0$ is achieved by applying an AC demagnetizing field. $\lambda_1$ is achieved by a DC pulse current sufficient to saturate the magnets. The advantage of the bistable device is reduced sensitivity to the applied current or to stray magnetic field.

For a continuous tuning of wavelength, the square loop characteristic of fiber strain vs. applied magnetic field is not always desirable as the steep side of the curve in FIG. 3(a) can pose a control problem when a certain intermediate strain is aimed at, e.g., for tuning over a many-channel span. For ease of controlling the strain in the fiber grating, the M-H and $\epsilon$-H loop can be skewed as in FIG. 3(b). This is achieved by increasing the self-demagnetizing field of the magnets e.g., by either increasing effective diameter of the magnet or reducing the length and thus decreasing the magnet length-to-diameter aspect ratio. The optimal skewing of the loop is as illustrated in FIG. 3(b), i.e., the remanent magnetization or the remanent fiber strain when the applied field is removed is still essentially the same as the saturation value (at least 90%) and the onset field of rapid decrease of M or $\epsilon$ when the field is reversed is near zero field and preferably in the range of ±30% of the coercive force, even more preferably in the range of ±10% of the coercive force ($H_c$). An excessive skewing of the M-H or $\epsilon$-H loop as shown in FIG. 3(c) is not desirable as this causes a deterioration of the latchability of strain induced in the grating. Such a deterioration in latchable strain is indicated by arrows in FIG. 3(c).

An example of intentional loop skewing is as follows. For an Fe-28%Cr-7%Co alloy, deformation-aged to yield a square M-H loop with $H_c$ of 70 Oe, a dimension of 0.180" diameter and 4" length introduces a skewing of the M-H loop by ~60 Oe, producing a M-H loop similar to FIG. 3(b).

The preferred assembly steps for making the magnetically tunable and preferably latchable optical fiber grating of FIG. 2 is as follows. The first step for assembly of such a tunable grating device is to provide an optical fiber grating, e.g., Bragg grating having a desired Bragg reflection wavelength for dropping or adding a wavelength component. For example, for a median light beam wavelength of 1550 nm, the Bragg grating periodicity $\Lambda$ in a $SiO_2$ based fiber (with a refractive index n~1.45) is 500 nm. The length of each optical fiber grating to be incorporated into the magnetically tunable grating assembly is typically in the range of 5 mm to 200 mm and preferably in the range of 10–100 mm. For the short fiber grating, the region of the regular fiber outside the grating can be used for attachment to either the magnetic components or the guiding container (or a substrate).

The next step is to provide magnetic components and a guiding container to be attached to the fiber grating. At least two magnetic components, each either a single piece or an aggregate, are needed. They are oriented with their magnetic poles preferably parallel to the axis of the fiber grating. In the inventive tunable grating, at least a portion of each magnetic component should be semi-hard or permanent with a remanent magnetization. Yet its strength in at least one magnet should be programmable, erasable and reprogrammable by altering the applied magnetic field. When the two magnets have the opposite magnetic poles facing each other, e.g., the north against the south pole, they attract each other. The fiber grating attached to one of the magnet and the guiding container is under tensile stress, with the tensile elastic strain $\epsilon$ proportionally increasing as the stress $\sigma$ is increased ($\epsilon=\sigma/E$ where the elastic modulus $E=1.5\times10^6$ psi for silica glass).

The third step is to align and attach the grating to one of the magnets and the guiding container. To assure a strong bonding and minimize strain relaxation at the bond interface, the use of mechanically strong, non-thermoplastic adhesive or a solder with a relatively high melting point, high mechanical strength and high creep resistance is desired. The fiber surface to be attached is desirably coated with a metallization layer to improve the solder bond strength.

For maximizing the magnetic force for a given volume of the magnet, the air gap between the facing poles should be very small. The magnetic force decreases as the gap is increased. The desired gap is less than about 80 mil, and preferably less than 20 mil, and even more preferably less than 10 mil. It is preferable to set the gap so that the maximum tensile strain in the fiber grating is kept to about ≠2% or less so that the risk of fiber breaking is minimized.

The preferred magnet materials are those whose magnetic properties are modifiable by a pulse magnetic field. Some examples of suitable magnets are Fe—Cr—Co, Fe—Al—Ni—o (Alnico), Cu—Ni—Fe (Cunife), Co—Fe—V (Vicalloy), specially-processed, low-coercivity ($H_c$) rare earth cobalt (Sm—Co) or Nd—Fe—B magnets, and Ba-ferrite or Sr-ferrite magnets. The desired range of the coercivity for the programmable magnet is typically below 500 Oe and preferably below 100 Oe for the ease of programming by re-magnetization using solenoid pulse field. The coercivity is typically above 10 Oe and preferably above 30 Oe for maintaining the stability of the remanent magnetization and also for stability against demagnetization due to stray magnetic fields. For satisfactory latchability of fiber strain when the field is removed, the programmable magnet should have a square magnetization hysteresis loop with the squareness ratio (remanent magnetization/ saturation magnetization) of at least 0.85, preferably at least 0.90, even more preferably at least 0.95. Mechanically ductile and easily formable or machineable magnet alloys such as Fe—Cr—Co, Cu—Ni—Fe, Co—Fe—V are particularly desirable for shaping into desired rod-like geometry shown in FIG. 2. Stable permanent magnets with high coercive forces (e.g., $H_c$>1000 Oe), such as Sm—Co or Nd—Fe—B are less desirable (unless modified to exhibit lower coercive forces) because of the difficulty in reprogramming the remanent magnetization using desirably low magnetic field. These stable magnets, however, can be used for supplying a basis (or bias) field, in combination with programmable magnets.

The next assembly steps are to add at least one solenoid winding around the magnetic components and to apply a programmed pulse or a short-duration field to adjust or remove the remanent magnetization in the magnets. This adjustment alters the force and the strain on the fiber grating, and hence optical signal wavelength or amplitude. A constant DC field, instead of a pulse field can also be used, but the use of a DC pulse field is preferred so that a constant supply of electrical current to the solenoid is avoided. The desired duration or speed of the pulse field is typically in the range of $10-10^{-8}$ seconds, preferably $10-10^{-6}$ seconds and even more preferably $10^{-1}-10^{-4}$ seconds. For a thick magnet geometry, the use of pulses that are too fast is not desirable because of the eddy current loss. The shape of the current pulse can be rectangular, rectified sinusoidal or irregular as long as the maximum field needed for a magnetization to the pre-determined remanence is accomplished.

The last step is to combine a multiplicity of the magnetically tunable and latchable gratings with circulators and other optical components, and implement the wavelength-selective optical cross-connect system.

EXAMPLE 1

A tunable optical fiber grating device was assembled as follows. The grating has an unstrained Bragg reflection wavelength of 1549.7 nm. Fe-28 wt % Cr-7 wt % Co alloy rod (0.108 inch diameter) was fabricated by deformation aging to exhibit a square magnetic hysteresis loop with $H_c \sim 85$ Oe and the squareness ratio $M_r/M_s$ (the remanent magnetization/saturation magnetization) of ~0.97. The length of the magnet rod was reduced to 2.2 inches so that the M-H loop is skewed by ~30 Oe. One end of the fiber grating was epoxy-bonded to the near-gap end of the programmable magnet while the other end of the grating was bonded to a stainless steel tube (~0.150 inch inside diameter) as illustrated schematically in FIG. 2, as described below. The other programmable magnet (the left hand side magnet in FIG. 2) was positioned adjacent to the right hand side magnet with a 6 mil air gap, and then was epoxy-bonded to the stainless steel tube. This assembly was placed in a solenoid and electrical current was passed to apply a magnetic field and then removed in order to induce remnant tensile strain on the fiber grating.

Figure 4:
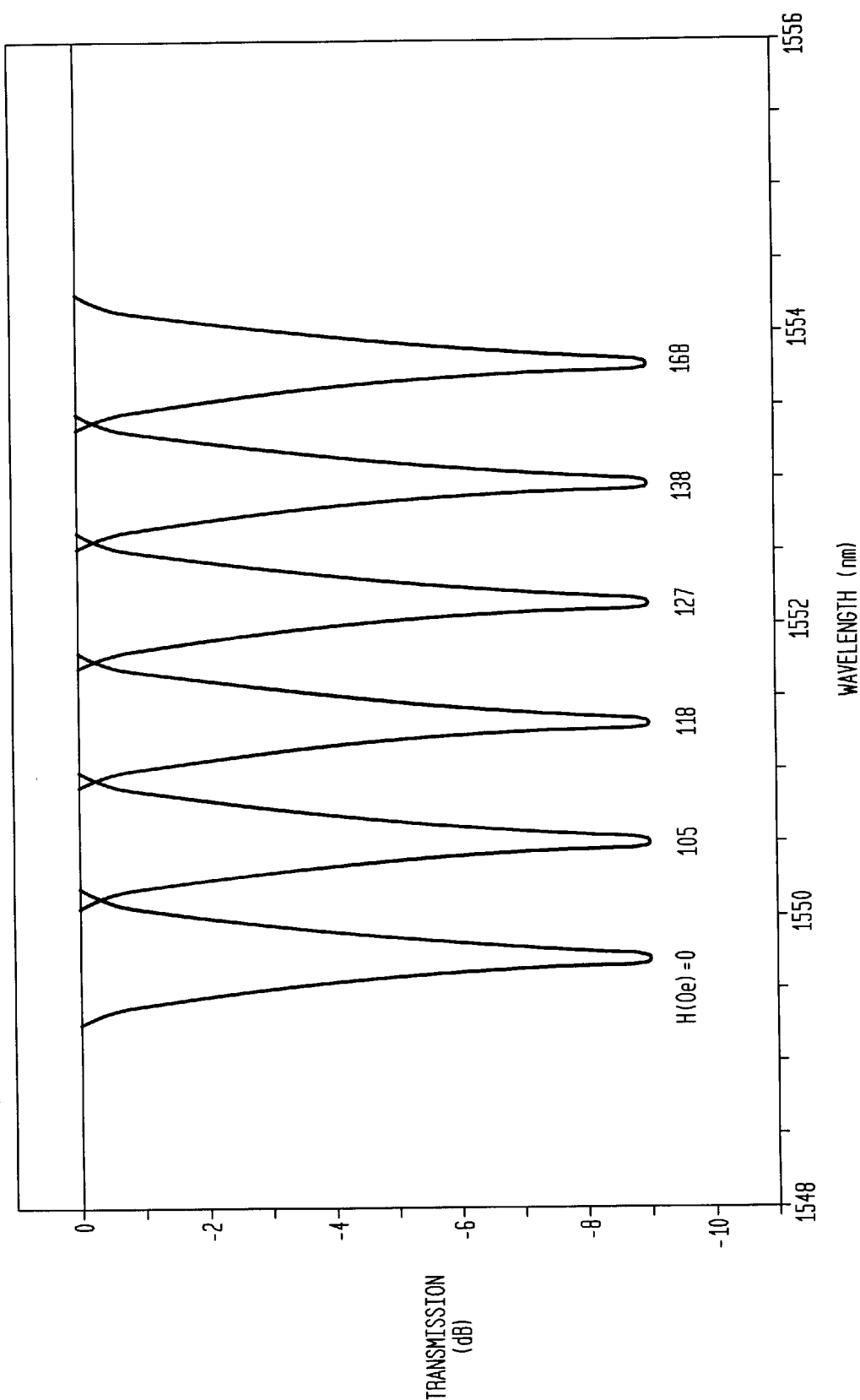
FIG. 4 shows experimental data of latched wavelength shifts obtained with a continuously-tunable fiber grating device using pulsed magnetic fields of different strengths.

Shown in FIG. 4 is the wavelength shift obtained using this (6-channel shifter module) grating. The wavelength shifts of 0.8, 1.6, 2.4, 3.2, and 4.0 nm are obtained by a field of 105, 118, 127, 138, and 168 Oe respectively, and are retained after the field is removed.

For operation of the tunable and latchable gratings in this invention, a magnetic field of suitable intensity needs to be applied for magnetization to a certain tuned state, remagnetization to a different tuned state, or demagnetization to remove the tensile strain completely. It is desirable to reduce the amount of power (electrical current) required in the solenoid to obtain a certain level of magnetic field.

For many wavelength-selective cross-connect switch systems, the required shift in wavelength of the grating can be relatively modest. For example, the Bragg gratings in the 2×2 switch of FIG. 1 (or in any N×N cross-connect switches in general), can be parked at a wavelength slightly away from the desired wavelength channel, e.g., between the two adjacent optical channel wavelengths. For these types of application, a bistable tunable grating device such as illustrated in FIG. 5 may be used instead of the FIG. 2 type tunable grating which allows a wider range of wavelength tuning.

Figure 5:
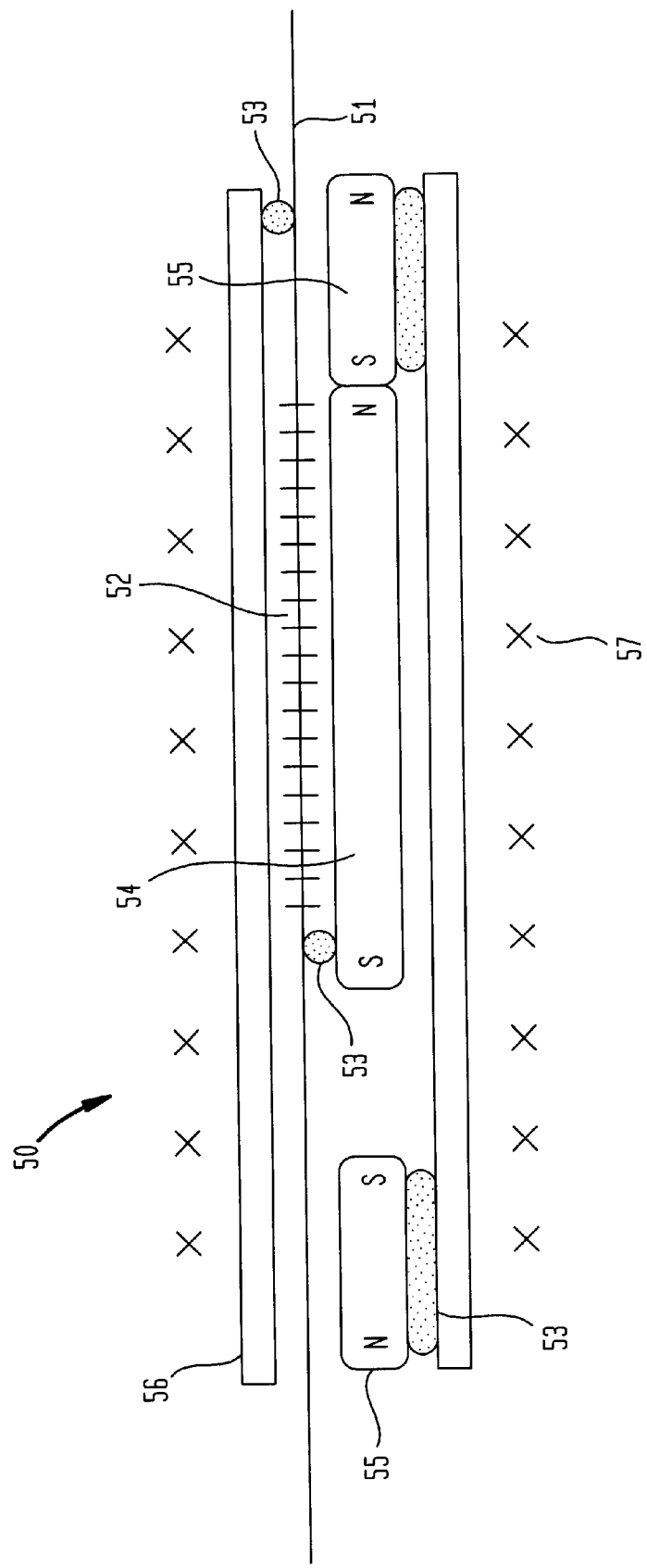
FIG. 5 is a schematic illustration of a bistable magnetically tunable fiber grating device.

FIG. 5 schematically illustrates an exemplary bistable fiber grating device 50 comprising a length of optical fiber 51 including a grating 52 of index perturbations. The fiber in the region of the grating is secured, as by bonds 53 or mechanical attachment, between a switchable magnet 54 and the guiding container 56 for transmitting magnetic force from the magnet 54 to the grating 52. The nonswitchable magnets 55, bonded to container 56, are provided for applying attractive or repulsive force to the switchable magnet 54. The switchable magnet 54 can have guided cylindrical shape, but non-round cross-sectional shapes are preferred in order to minimize fiber twisting during handling or service. One or more electromagnets (solenoids) 57 are disposed adjacent the magnet 54 for providing a sufficient magnetic field to switch the polarity when desired. The guiding container 56 is preferably a tube but can also have other configurations, e.g., it can comprise a two-part assembly with u-shaped bottom and top pieces.

The guiding container 56 is typically a tube made of glass, quartz, metal or plastic. The fiber grating is attached to magnet 54 and the guiding container 56 either by mechanical clamping or by bonds, as with epoxy, low melting point glass, or solder. In the use of solder, the fiber surface is desirably coated with a metal layer to improve solder bond strength. Here the adhesive is shown as bond 53. The switchable and mobile magnet 54, and the two nonswitchable and immobile magnets 55 are aligned with a small fixed (preset) gap between them. The two nonswitchable magnets are preferably oriented so that like poles face each other (S toward S or N toward N) with the switchable magnet placed between them.

In operation, the switchable and mobile magnet 54 is attracted and clicked to either the left-side nonswitchable magnet or the right-side nonswitchable magnet depending on the polarity of magnetization by the surrounding solenoid 57. By virtue of the magnetic pole arrangement, the switchable magnet is repelled by one of the nonswitchable magnet while the other nonswitchable magnet attracts it. Since there are only two fixed positions of the mobile magnets, there are only two fixed states of tensile strain and hence two grating wavelength states in the attached optical fiber grating. The preset gap between the fixed magnets 55 and the mobile magnet 14 determines the degree of shift in the grating wavelength in this bistable (digitally tunable) device. An important advantage of the device illustrated in FIG. 5 is the latchability and stability of the shifted wavelength. After a pulse or short-duration current to the solenoid is applied for actuation, the mobile magnet is latched to one of the two positions and electrical power is no longer needed to be supplied continuously.

It is important to make sure that the fiber grating is not subjected to a torsional deformation, as torsion alters the amount of strain applied to the grating, reduces the fiber breaking strength for a given tensile strain, and may distort optical signals. To eliminate or reduce torsional deformation, guiding mechanisms are provided for the mobile magnet, either by adding guide rails in the case of circular cross-sectioned container or by using a non-circular cross-sectioned container and a non-circular cross-sectioned magnet, e.g., an oval or square cross-sectioned container or magnet. The fiber can be located either outside the magnets or within a hole or a groove in magnets.

EXAMPLE 2

A bistable, tunable optical fiber grating device was assembled to the FIG. 5 configuration as follows. The grating has a Bragg reflection wavelength of 1556.480 nm. Fe-28 wt % Cr-7 wt % Co alloy rod (0.095 inch diameter) was fabricated by deformation aging to exhibit a square magnetic hysteresis loop with $H_c$~93 Oe and the squareness ratio $M_r/M_s$ (the remanent magnetization/saturation magnetization) of ~0.97, and used as the mobile, switchable magnet in FIG. 5. The length of the magnet rod was about 2 inches. Non-switchable magnets (two Nd—Fe—B magnets with 0.25 inch long and 0.125 inch diameter) were attached each end of the stainless steel guiding tube. One end of the fiber grating was epoxy-bonded to the left-hand side end of the switchable magnet while the other end of the grating was bonded to the stainless steel tube as illustrated schematically in FIG. 5. This assembly was placed in a solenoid and electrical current was passed to apply a magnetic field and then removed in order to switch the polarity of the remanent magnetization in the Fe—Cr—Co switchable magnet, so that it clicks to either the left hand side Nd—Fe—B permanent magnet or the right hand side Nd—Fe—B magnet.

Figure 6:
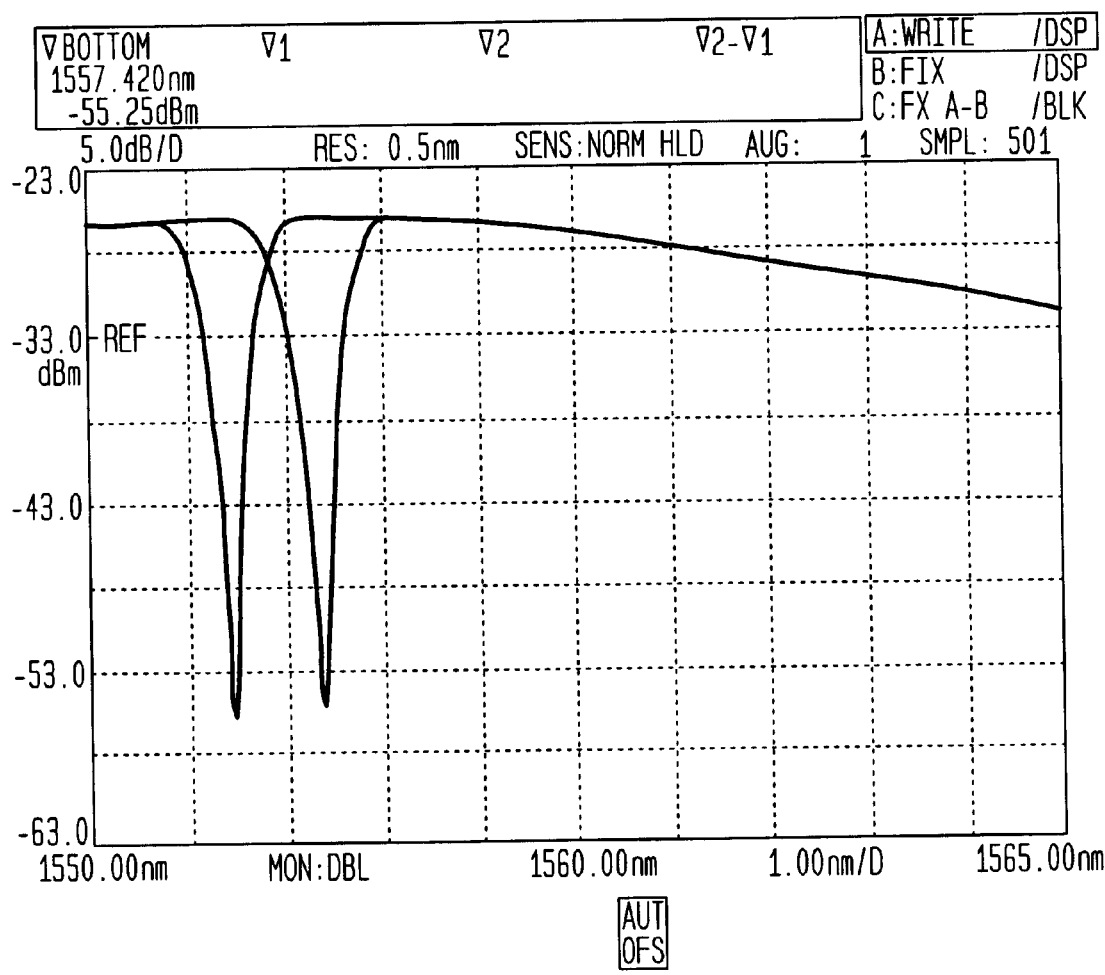
FIG. 6 shows experimental data of the two wavelengths repeatably achieved by a bistable magnetically tunable device by using magnetic fields of opposite sign.

FIG. 6 is a graphical illustration showing the wavelength shift experimentally obtained by the applied field of ±2000 Oe (supplied by ~1 millisecond pulse current in the solenoid) in bistable grating device described above. When the Fe—Cr—Co magnet was clicked to the left (H=+200 Oe), the wavelength of the fiber grating was 1557.420 nm while it was altered to 1556.480 nm when the magnet was switched (H=−200 Oe) and made to click to the right. The wavelength shift of $\Delta\lambda$=0.940 nm was reproducible upon switching by ±200 Oe many times.

Figure 7A:
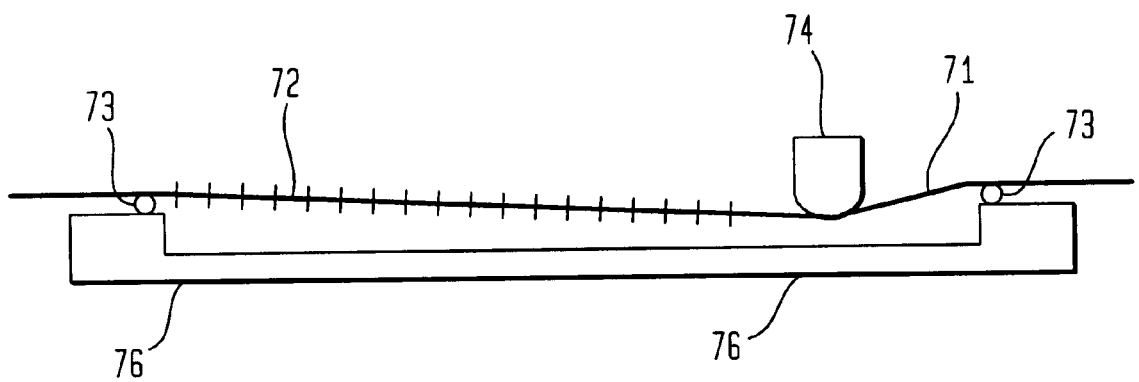
FIGS. 7(a)–(b) depict a variation of device construction to impart a strain on a fiber grating by using magnetically-controlled deflection of the fiber containing the grating.
Figure 7B:
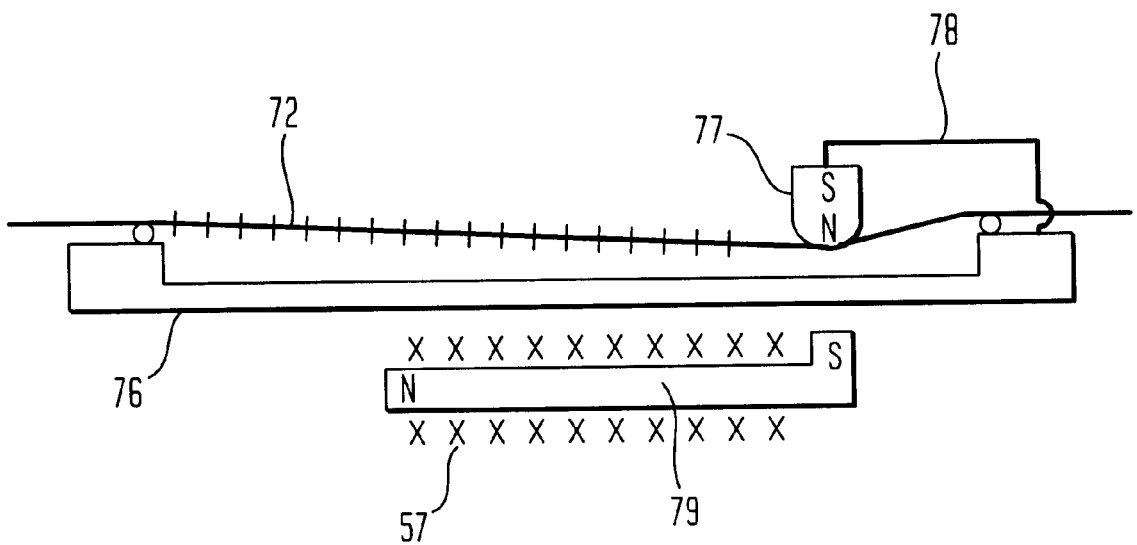

An alternative embodiment to obtain magnetic straining in the optical fiber makes use of flexing or deflection in the fiber as shown in FIGS. 7(a) and 7(b). As illustrated in FIG. 7(a), a length of fiber 71 including a grating 72 is affixed to two sides of a support frame 76 as by bonds 73. A mechanical arm 74 is provided for latchably straining the grating. The fiber grating is either mechanically or magnetically pressed down (or pulled up), preferably slightly outside the active grating region, so that a tensile strain is induced in the grating and the resonant wavelength (e.g., the Bragg reflection wavelength in Bragg-type gratings, or the peak-coupling wavelength in long-period type gratings) is altered. It is preferred that the induced strain and the wavelength shift are made latchable, e.g. by using a mechanical spring latch type structure or a magnetically attractive or repulsive force as shown in FIG. 7(b). The movable 77 magnet which is connected to the support frame by a spring arm 78, is magnetically attracted, partially released, or fully released depending on the magnitude of magnetization in the programmable magnet 79.

The bistable tunable grating devices according to the invention have several advantages. The wavelength shift induced is latchable after the applied field is removed, and hence no continuous power consumption is needed to maintain the wavelength shift. The device structure is relatively simple, and the electrical current (or voltage) applied to the solenoid for switching actuation is not critical in that one only needs to apply the current (or voltage) "greater than" a certain minimum value for switching operation to take place. The speed of wavelength shift (or channel add/drop) can be relatively fast, e.g., faster than 10 milliseconds.

The gratings described herein are especially useful in wavelength division multiplexed communication systems which employ multiplexer/demultiplexer devices. In such systems, a "trunk" fiber carries optical signal channels at several wavelengths $\lambda_1, \lambda_2, \ldots \lambda_n$ and it is desirable to extract a single wavelength channel from the trunk fiber or to add a single wavelength channel onto the trunk. A wide variety of such devices can be made by interconnecting optical circulators and fiber gratings. Typically the channel reflected by the grating is dropped to the trunk fiber or is added to the trunk. Gratings as described herein permit selection at the grating of which channel is dropped or added. A series of bistable tunable gratings can be placed between a pair of circulators, with their grating wavelengths located at between-channel wavelengths. Actuation of desired grating for one-half channel shift in wavelength drops or adds the adjacent communication channel.

Referring back to FIG. 1 the magnetically controllable fiber gratings 105 disposed along interconnecting optical fibers 125–128 between optical router portion 150 and optical combiner portion 151 facilitate a switching function on a wavelength by wavelength basis. More specifically, routing of individual channels of the multi-wavelength optical signals is controlled along the interconnecting optical fibers 125–128 based on whether fiber gratings 105 are in a transmissive mode (i.e., the channel of a particular wavelength will be transmitted through the grating) or in a reflective mode (i.e., the channel of a particular wavelength will be reflected back).

III. Alternative Embodiments of the Switch

Figure 8A:
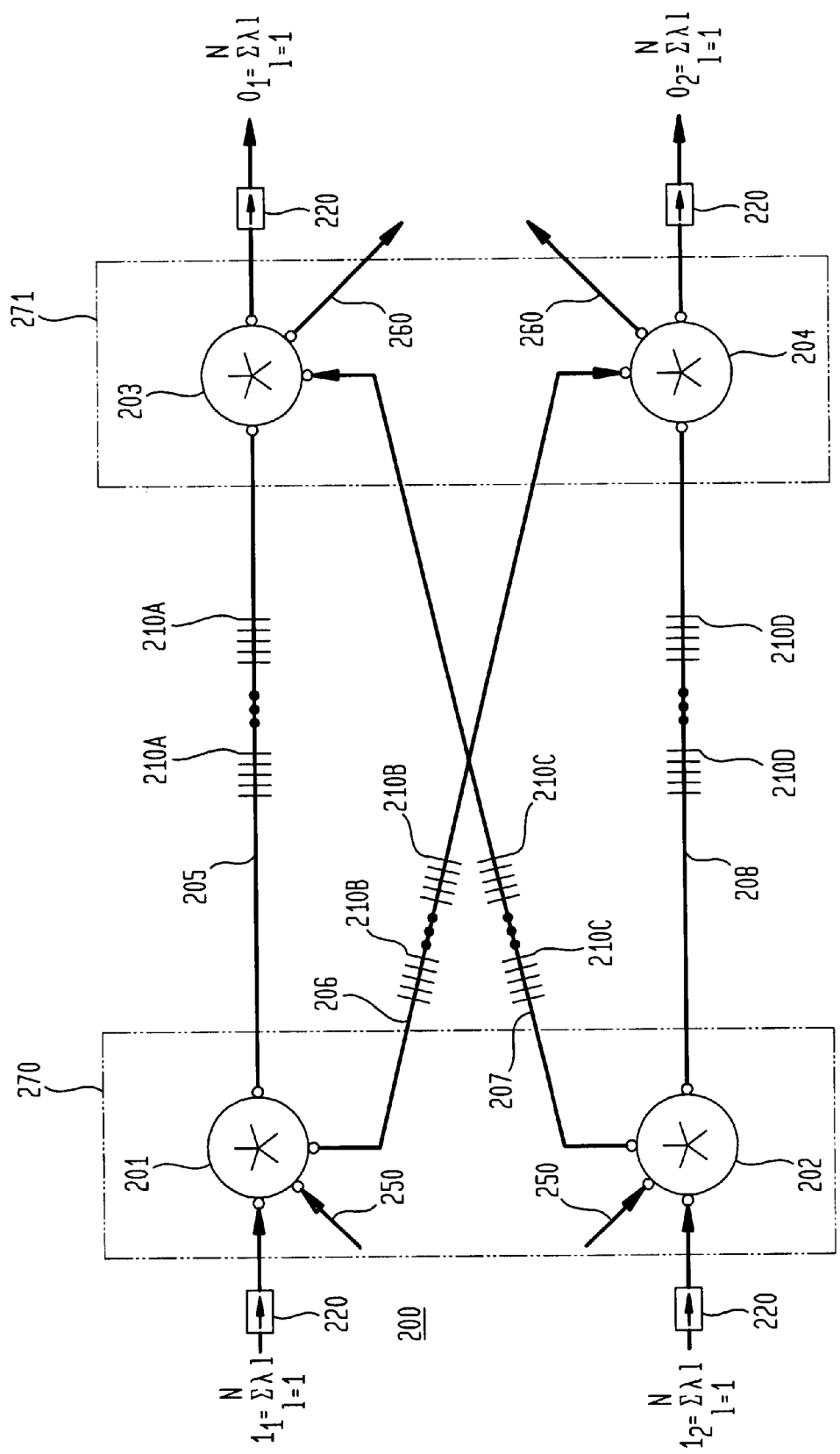
FIG. 8(a) is another illustrative embodiment of a 2×2 wavelength-selective optical switch according to the principles of the invention.

FIG. 8(a) shows an alternative embodiment of a 2×2 optical switch 200 according to the principles of the invention. Similar to the embodiment shown in FIG. 1, optical switch 200 comprises an optical router portion 270 and an optical combiner portion 271. Optical router portion 270, which includes optical couplers 201 and 202 distributes multi-wavelength optical input signals $I_1$ and $I_2$. Optical combiner portion 271, which includes optical couplers 203 and 204, combines multi-wavelength optical signals for output as output signals $O_1$ and $O_2$. More specifically, optical couplers 201 and 202 receive multi-wavelength optical input signals $I_1$ and $I_2$, respectively, and optical couplers 203 and 204 supply multi-wavelength optical output signals $O_1$ and $O_2$, respectively. Optical couplers 201–204 may comprise passive optical couplers, such as passive star couplers, which are well-known in the art or any other known devices capable of coupling optical energy. For simplicity of explanation, reference will be made hereinafter to star couplers 201–204.

Star couplers 201–204 are coupled together via interconnecting optical fibers 205–208, which are wavelength-selective optical fibers comprising wavelength-selective elements 210 disposed therein. Wavelength-selective elements 210 may comprise tunable fiber Bragg gratings which are well-known in the art or any other known wavelength-selective filters. For simplicity of explanation, reference will be made hereinafter to fiber gratings 210. As shown, optical fiber 205 includes fiber gratings 210A, optical fiber 206 includes fiber gratings 210, optical fiber 207 includes fiber gratings 210C, and optical fiber 208 includes fiber gratings 210D. As shown, star coupler 201 is coupled to star coupler 203 on a straight-through path via wavelength-selective optical fiber 205. Star coupler 201 is coupled to star coupler 204 on a cross-over path via wavelength-selective optical fiber 206. Similarly, star coupler 202 is coupled to star coupler 204 on a straight-through path via wavelength-selective optical fiber 208. Star coupler 202 is also coupled to star coupler 203 on a cross-over path via wavelength-selective optical fiber 207.

As shown in FIG. 8(a), optional optical isolators 220 can also be coupled to selected input and output ports of the star couplers in order to protect against backscattering or reflection of the optical signals which could, for example, damage certain components. Accordingly, optional optical isolators 220 can be used to reduce interference from unwanted reflections (e.g., counter-propagating signals).

Star couplers 201 and 202 can be 1×2 couplers where by an optical signal received as input is broadcast to all outputs. Star couplers 203 and 204 are 2×1 couplers whereby a single output is formed by combining all inputs. The operation of star couplers are well known. For example, it is well known that a 1×M optical coupler will equally broadcast a single input, such as a multi-wavelength optical signal, onto each of its M output ports. Although the embodiment shown in FIG. 8A uses 1×2 and 2×1 star couplers, it should be noted that the principles of the invention may be applied with any size star coupler. Accordingly, the embodiments shown and described herein are meant to be illustrative and not limiting. For example, as will be described below in more detail, any size cross-connect can be realized using a basic two stage cross-connect architecture according to the principles of the invention, wherein optical router portion 270 represents one stage (for routing signals) and optical combiner portion 271 represent another stage (for combining signals). As a result, this architecture is less complex and less costly than prior arrangements which require multiple stages of switch fabric.

Referring again to FIG. 8(a), each output port of star coupler 201 will carry a portion of the optical energy of the entire multi-wavelength optical signal $I_1$ (i.e., all wavelengths $\lambda_1$ to $\lambda_N$), and each output port of star coupler 202 will carry a portion of the optical energy of the entire multi-wavelength optical signal $I_2$ (i.e., all wavelengths $\lambda_1$ to $\lambda_N$). Multi-wavelength optical input signal $I_1$ will therefore be broadcast onto both wavelength-selective optical fibers 205 and 206 via star coupler 201, and input signal $I_2$ will be broadcast onto both wavelength-selective optical fibers 207 and 208 via star coupler 202.

Because the entire multi-wavelength signal is broadcast on all outputs of the corresponding star coupler, fiber gratings 210 are disposed in all of the wavelength-selective optical fibers that interconnect star couplers 201–204. The fiber gratings 210 are required in each path so that selected channels of particular wavelengths can be transmitted or reflected as appropriate in the interconnecting optical fibers 205–208 between the star couplers 201–204. In the particular embodiment shown in FIG. 8(a), fiber gratings 210 could operate as band pass filters which would be tuned to pass selected channels of particular wavelengths from the multi-wavelength optical signals $I_1$ and $I_2$. For example, fiber gratings 210A could be tuned to pass only selected wavelengths from star coupler 201 to star coupler 203. Similarly, fiber gratings 210B could be tuned to pass other selected wavelengths from star couplers 201 to 204. Fiber gratings 210C and 210D are also tuned accordingly to pass selected wavelengths as desired.

In operation, optical switch 200 differs from optical switch 100 (FIG. 1) in that star couplers are used as opposed to optical circulators. More specifically, a multi-wavelength optical signal comprising individual channels each having a particular wavelength is provided as input $I_1$ to star coupler 201 in optical router portion 270. Star coupler 201 broadcasts or routes the entire multi-wavelength optical signal (i.e., all channels having wavelengths $\lambda_1$ to $\lambda_N$) onto wavelength-selective optical fibers 205 and 206. Those individual channels having wavelengths that are in the transmissive band of fiber gratings 210A are transmitted as a "through" connection to star coupler 203. This "through" routing would be the functional equivalent of the bar state of a cross-bar switch. Those wavelength channels having wavelengths that are in the reflection band of fiber gratings 210A are reflected back to star coupler 201. Similarly, those individual channels having wavelengths that are in the transmissive band of fiber gratings 210B are transmitted via wavelength-selective optical fiber 206 to star coupler 204. This cross-connection routing between star couplers 201 and 204 would be the functional equivalent of the cross state of a cross-bar switch. Those channels having wavelengths that are in the reflection band of fiber gratings 210B are reflected back to star coupler 201. The same principles of operation apply to optical signal $I_2$ entering star coupler 202 and will not be repeated here for reasons of brevity.

In optical combiner portion 271, star coupler 203 receives individual channels of particular wavelengths that are routed on the "through" path along optical fiber 205 from star coupler 201. Star coupler 203 also receives individual channels of particular wavelengths that are routed on the "cross-connection" path along optical fiber 207 from star coupler 202. Star coupler 203 combines the individual channels of different wavelengths from all its inputs and supplies a combined multi-wavelength optical signal as output $O_1$. The same principles of operation apply to star coupler 204 and will not be repeated here for reasons of brevity. In effect, output signal $O_1$ may include individual channels from input signal $I_1$ ("through" channels) as well as individual channels from input signal $I_2$ ("cross-connect" channels).

Figure 8B:
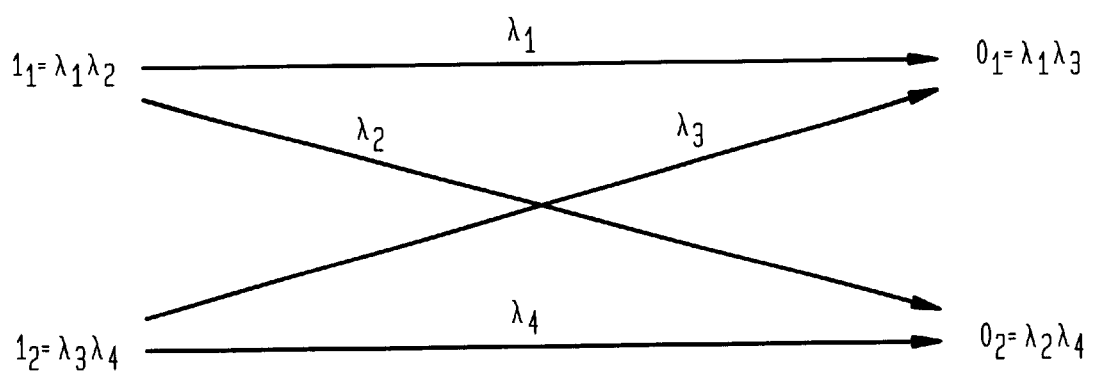
FIG. 8(b) is a simplified diagram showing an illustrative example of the operation of the 2×2 wavelength-selective optical switch shown in FIG. 2A.

FIG. 8(b) shows a simplified diagram of a specific example of the operation of optical switch 200 in which multi-wavelength optical signal $I_1$ includes two individual channels wavelengths $\lambda_1$ and $\lambda_2$) and multi-wavelength optical signal $I_2$ includes two individual channels wavelengths $\lambda_3$ and $\lambda_4$). As shown, assume a cross-connect scenario in which it is desirable for output signal $O_1$ to include wavelength channels $\lambda_1$ and $\lambda_3$ and output signal $O_2$ to include wavelength channels $\lambda_2$ and $\lambda_4$. Accordingly, optical switch 200 (FIG. 8(a)) would be configured so that fiber grating 210A would be transmissive with respect to $\lambda_1$ and reflective with respect to $\lambda_2$. Fiber grating 210B would be transmissive with respect to $\lambda_2$ and reflective with respect to $\lambda_1$. Similarly, fiber grating 210C would be transmissive with respect to $\lambda_3$ and reflective with respect to $\lambda_4$ and fiber grating 210D would be transmissive with respect to $\lambda_4$ and reflective with respect to $\lambda_3$. It should be noted that this example illustrates that the wavelength assignments for the individual channels in the various input and output signals (e.g., $I_1$, $I_2$, $O_1$, and $O_2$) are not necessarily the same even though each is represented by $$\sum_{i=1}^{N} \lambda_i$$

for simplicity of explanation.

In view of the foregoing description, it can be seen that fiber gratings 210A–210D are used to facilitate routing (e.g., broadcasting, distributing, etc.) of individual wavelength channels within multi-wavelength optical signals in conjunction with optical router portion 270. The same fiber gratings 210A–210D are also used to facilitate combining (e.g., multiplexing, coupling, etc.) of individual wavelength channels within multi-wavelength optical signals in conjunction with optical combiner portion 271. By including tunable fiber gratings 210 within each of wavelength-selective optical fibers 205–208 that interconnect star couplers 201–204, optical switch 200 therefore provides a very flexible wavelength-selective cross-connect capability.

According to another aspect of the invention, FIG. 8(a) illustrates the use of previously unused ports on star couplers 201–204 to provide a wavelength-selective local add/drop capability. As shown, previously unused input ports 250 can be used on star couplers 201 and 202 for adding individual channels of particular wavelengths to the multi-wavelength optical signals. Similarly, previously unused output ports 260 can be used on star couplers 203 and 204 for dropping selected individual channels having a particular wavelength from the multi-wavelength optical signals.

In operation, a drop function using star couplers according to the embodiment shown in FIG. 8(a) may require additional components, such as filters or other wavelength-selective elements, to filter out the desired wavelength channel to be dropped. For example, a wavelength-selective filter that is only transmissive for $\lambda_1$ would be needed in drop path 260 in order to drop only wavelength channel $\lambda_1$ from the multi-wavelength optical signal. It should also be noted that the add/drop configuration shown in FIG. 8(a) is only meant to be illustrative. As such, those skilled in the art will understand that any combination of available ports on star couplers 201–204 may be used for add or drop paths as desired. By way of example only, star couplers 201 and 202 may also support a drop function depending on the availability of ports.

By taking advantage of the design flexibility of star couplers and the wavelength-selectivity capabilities of fiber gratings, a programmable add/drop capability can be extended without changing the basic switch fabric. In particular, the add/drop capability is extensible in that star couplers can be designed with additional ports for later use and programmable in that fiber gratings can be tuned or programmed accordingly to drop or add selected wavelength channels.

FIG. 9 shows K×M optical cross-connect arrangement 300. With the exceptions noted below, the principles of operation previously described for 2×2 optical switch 200 (FIG. 9A) apply equally to K×M optical cross-connect arrangement 300 described herein.

Briefly, optical cross-connect arrangement 300 receives K multi-wavelength optical signals each having individual channels of different wavelengths as inputs, routes the individual channels of the multi-wavelength optical signals between K cross-connect inputs and M cross-connect outputs, and supplies M multi-wavelength optical signals as outputs. Optical cross-connect arrangement 300 comprises an optical router portion 340 and an optical combiner portion 341. Optical router portion 340, which includes optical couplers 310, broadcasts multi-wavelength optical signals $I_1$, $I_2$ through $I_K$ received at K cross-connect input ports 305. Optical combiner portion 341, which includes optical couplers 320, combines multi-wavelength optical signals and supplies these as outputs $O_1$, $O_2$ through $O_M$ at M cross-connect output ports 315. Fiber gratings 330 are provided along interconnecting optical fibers 325 to facilitate the routing of the individual channels of the multi-walvelength optical signals between optical router portion 340 and optical combiner portion 341.

For simplicity of illustration in FIG. 9, only inputs $I_1$, $I_2$, and $I_K$ and outputs $O_1$, $O_2$, and $O_M$ are shown while inputs $I_3$ through $I_{K-1}$ and outputs $O_3$ through $O_{M-1}$ have been omitted. Furthermore, each input and output signal is shown for simplicity of explanation to include the same wavelength set, represented by $$\sum_{l=1}^{N} \lambda_l,$$

but could easily be different wavelength sets.

K cross-connect input ports 305 are coupled to input optical fibers 301–303 for receiving multi-wavelength optical input signals $I_1$, $I_2$, through $I_K$. An input optical coupler 310, shown here as a 1×M star coupler having one input port and M output ports, is associated with each of cross-connect input ports 305 in optical router portion 340. Each input optical coupler 310 is capable of broadcasting the multi-wavelength optical signal from its single input port to its M output ports. In the optical combiner portion 341 of optical cross-connect arrangement 300, a plurality of cross-connect output ports 315 are coupled to output optical fibers 350–352 that carry the routed multi-wavelength optical signals. An output optical coupler 320, shown here as a K×1 star coupler having K input ports and a single output port, is associated with each of cross-connect output ports 315. Each output optical coupler 320 is capable of combining the individual wavelength channels received at all its input ports.

Input optical couplers 310 and output optical couplers 320 are coupled together via interconnecting wavelength-selective optical fibers 325. Wavelength-selective optical fibers 325 include wavelength-selective elements 330, such as tunable fiber gratings, for transmitting or reflecting any of the individual wavelength channels in the multi-wavelength optical signals in the same manner previously described for the other embodiments. Interconnecting wavelength-selective optical fibers 325 provide a fully connective switch fabric which allows for any of the N wavelength channels from any multi-wavelength optical input signals $I_1$, $I_2$, through $I_K$ to be routed to any of the cross-connect output ports 315 on a non-blocking basis.

In a similar manner as described for the previous embodiments, fiber gratings 330 are used to facilitate routing (e.g., broadcasting, distributing, etc.) of individual wavelength channels within multi-wavelength optical signals in conjunction with optical router portion 340. The same fiber gratings 330 are also used to facilitate the combination (e.g., multiplexing, coupling, etc.) of individual wavelength channels within multi-wavelength optical signals in conjunction with optical combiner portion 341. By including tunable fiber gratings 330 within each of wavelength-selective optical fibers 325 that interconnect optical couplers 310 and 320, optical cross-connect arrangement 300 therefore provides a very flexible wavelength-selective cross-connect capability.

As illustrated in FIG. 9 for the K×M switch fabric, there are K·M wavelength-selective optical fibers 325 interconnecting optical router portion 340 and optical combiner portion 341, where K represents the number of cross-connect input ports 305 and M represents the number of cross-connect output ports 315. When K=M, FIG. 9 shows a symmetric switch having an equal number of input and output ports. Consequently, for a 3×3 cross-connect based on the arrangement in FIG. 9, there will be 3 wavelength-selective optical fibers 325 between each input optical coupler 310 and each output optical coupler 320 for a total of 9 wavelength-selective optical fibers. However, it should be noted that any size cross-connect arrangement, whether a square switch matrix with K=M or a non-square switch matrix with K≠M, may be used to realize the present invention. Importantly, the embodiment shown in FIG. 9 illustrates how any size cross-connect can be realized using the basic two stage cross-connect architecture according to the principles of the invention, wherein optical router portion 340 represents one stage (for receiving and routing K multi-wavelength optical input signals) and optical combiner portion 341 represent another stage (for combining and supplying M multi-wavelength optical output signals). As indicated, this cross-connect architecture is less costly and less complex than prior arrangements which use multiple stages of switch fabric for routing signals.

The number of tunable fiber gratings 330 may also vary according to the size of the cross-connect arrangement as well as the particular fiber grating design implementation. For example, a separate tunable fiber grating 330 may be used for each of the N wavelengths or a single tunable fiber grating 330 may be used to pass or reflect more than one of the N wavelengths. Additionally, wavelength-selective optical fibers 325 may include other fiber gratings for other purposes, such as gain flattening, for example. Using the example where each tunable fiber grating 330 corresponds to one of the N wavelength channels, the number of fiber gratings 330 needed to carry out switching of the individual channels of multi-wavelength optical signals having N wavelength channels is K·M·N. For example, in a 4 wavelength system using a 3×3 cross-connect, i.e., K=M=3 and N=4, there will be 3 wavelength-selective optical fibers 325 between each input optical coupler 310 and each output optical coupler 320 for a total of 9 wavelength-selective optical fibers. Because each path must be capable of reflecting/passing each of the 4 wavelengths, 36 magnetically tunable fiber gratings are required. Again, other modifications or variations of the embodiment described above are possible without departing from the spirit and scope of the present invention.

If the cross-connect switch fabric is large, i.e., if K·M is large, amplification may be needed to compensate for insertion and other losses that may occur as signals are broadcast and combined by the optical couplers. Many different amplifier schemes may be employed in conjunction with the teachings of the present invention. For example, various semiconductor optical amplifiers and fiber optical amplifiers can be used. The use of fiber amplifiers, and specifically erbium-doped fiber amplifiers, is well-known in the art and will be used in the examples described below. It should be noted that although erbium-doped fiber amplifiers are particularly well-suited to provide amplification in the present invention, and will be described herein, other suitable rare-earth elements may also be used, such as praseodymium, neodymium, and the like.

According to the principles of the invention, optical fiber amplification may be incorporated using a number of different configurations. For example, fiber optical amplifiers 390 may be placed before input optical couplers 310 in optical router portion 340 or after output optical couplers 320 in optical combiner portion 341. Alternatively, fiber optical amplifiers (not shown) may be distributed within the wavelength-selective optical fibers 325 in a similar manner as that described in our co-pending U.S. application Ser. No. 08/777,890, filed Dec. 31, 1996, which is herein incorporated by reference. In yet another configuration, fiber optical amplifiers (not shown) may be judiciously integrated with the tunable fiber gratings 330 along wavelength-selective optical fibers 325 as described in our co-pending U.S. applications, Ser. Nos. 08/920,390 and 08/920,391, both filed on Aug. 29, 1997, both of which are herein incorporated by reference.

Although not explicitly shown in FIGS. 8 and 9, it is contemplated that selected ones of fiber gratings 210 and 330, respectively, can be controlled to facilitate the appropriate "through" routing and "cross-connect" routing of individual channels within the multi-wavelength optical signals. Accordingly, the various control techniques previously described for FIG. 1 apply equally to the embodiments shown in FIGS. 8 and 9.

Figure 10A:
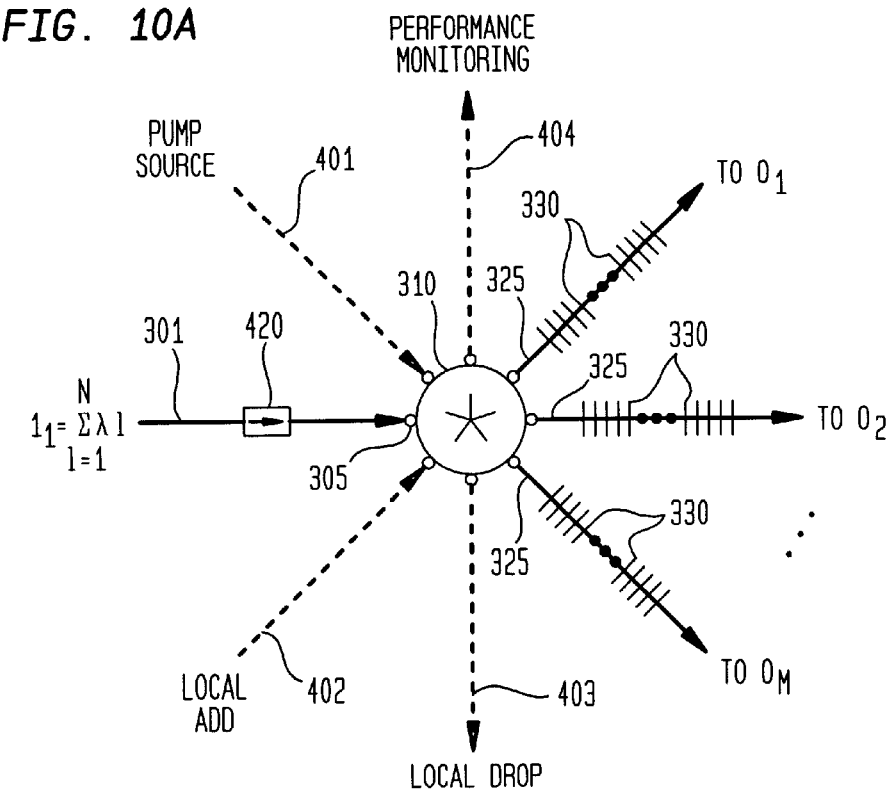
FIG. 10(a) shows the 1×M wavelength-selective optical router portion of the K×M wavelength-selective cross-connect arrangement of FIG. 3.
Figure 10B:
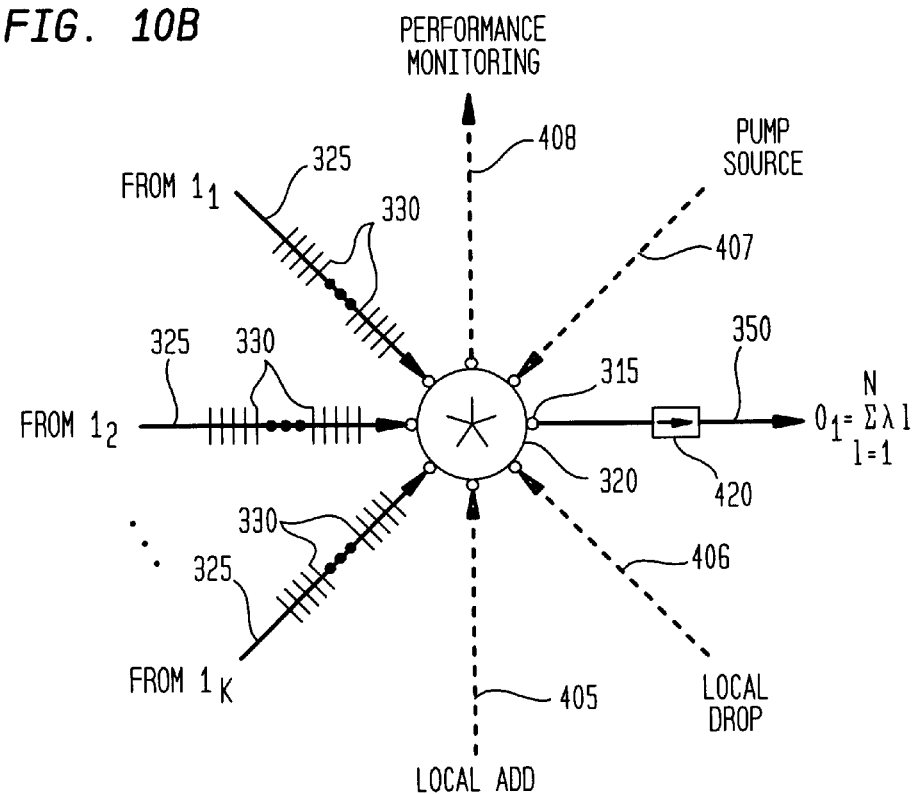
FIG. 10(b) depicts the K×1 wavelength-selective optical combiner portion of the K×M wavelength-selective cross-connect arrangement of FIG. 3.

FIG. 10(*a*) shows one of the input optical couplers 310 from optical router portion 340 of optical cross-connect arrangement 300 (FIG. 9). The configuration in FIG. 10(*a*) essentially represents a 1×M wavelength-selective optical distributor which is a basic building block for the K×M wavelength-selective cross-connect arrangement. As previously described, each input optical coupler 310 is typically configured as a 1×M optical coupler, such as a passive star coupler, in which a single input signal is broadcast among M outputs. In practice, a 1×M optical coupler, such as a 1×M star coupler, is typically fabricated by fusing together M optical couplers so that there are M inputs and M outputs. In effect, a 1×M optical coupler is essentially an M×M optical coupler. As such, a 1×M optical coupler will have the same loss and approximate implementation cost of an M×M coupler. However, in operation, only one of the inputs of the 1×M coupler is used to receive an input signal that is then broadcast to M outputs.

Building on this example, FIG. 10(*a*) shows how previously unused ports can be used in optical coupler 310 to provide additional functionality. In addition to cross-connect input port 305 that receives the multi-wavelength optical signal via input optical fiber 301, a previously unused input port 401 may be used to supply the pump light from a pump source (not shown) for a fiber optical amplifier (not shown). Also, another previously unused input port 402 may be used as a local add port for adding wavelength channels to the multi-wavelength optical signal. In addition to the output ports that are used for broadcasting the multi-wavelength optical signals via wavelength-selective optical fibers 325, previously unused output ports may also be used as local drop ports 403 for dropping individual wavelength channels, or as access ports 404 for performance monitoring applications and the like. Optional isolator 420 is also shown for those applications which require protection against back reflections as previously described.

Similarly, FIG. 10(*b*) shows one of the output optical couplers 320 from optical combiner portion 341 of optical cross-connect arrangement 300 (FIG. 9). This configuration in FIG. 10(*b*) essentially represents a K×1 wavelength-selective optical combiner which is the other essential building block of the K×M cross-connect arrangement. As previously described, each output optical coupler 320 is typically configured as a K×1 optical coupler, such as a passive star coupler, in which a single output is combined from K input signals. As shown, previously unused input and output ports on output optical coupler 320 can be used to provide additional capability in the same manner as that previously described for input optical coupler 310 in FIG. 10(*a*). For example, optical coupler 320 may include a local add port 405, a local drop port 406, a port 407 for pump light, and a performance monitoring port 408.

The wavelength-selective optical cross-connect arrangement according to the principles of the invention has considerable design flexibility in terms of being able to support multi-wavelength systems of any size (i.e., any number of wavelengths and any number of inputs and outputs) as well as being able to accommodate additional service requirements without significant changes to the switch fabric. As previously described, the cross-connect arrangement also supports an extensible add/drop capability that can be dynamically tailored depending on the add/drop requirements. The cross-connect arrangement is also useful in both drop and continue applications as well as in broadcasting applications.

IV. Packaging the Switch

It is known that the performance of optical fiber gratings is altered when the ambient temperature is changed. See, for example, U.S. Pat. No. 5,694,503 issued to D. A. Fleming et al. on Dec. 2, 1997. In Bragg gratings, both $n_{eff}$ and $\Lambda$ are temperature dependent, with the net temperature dependence for a grating in silica-based fiber exemplarily being about +0.0115 nm/° C., for $\lambda$=1550 nm. The temperature-induced shift in the reflection wavelength typically is primarily due to the change in $n_{eff}$ with temperature. The thermal expansion-induced change in $\Lambda$ is responsible for only a small fraction of the net temperature dependence of a grating in a conventional $SiO_2$-based fiber. In order to ensure a reliability and repeatability of the wavelength selective optical cross-connect system in optical networking, the possible variation of the performance such as caused by the change in ambient temperature should be minimized or eliminated. In the present invention, additional embodiments are incorporated to make the cross-connect system essentially independent of the ambient temperature change. The following three approaches are used for that purpose.

Figure 11B:
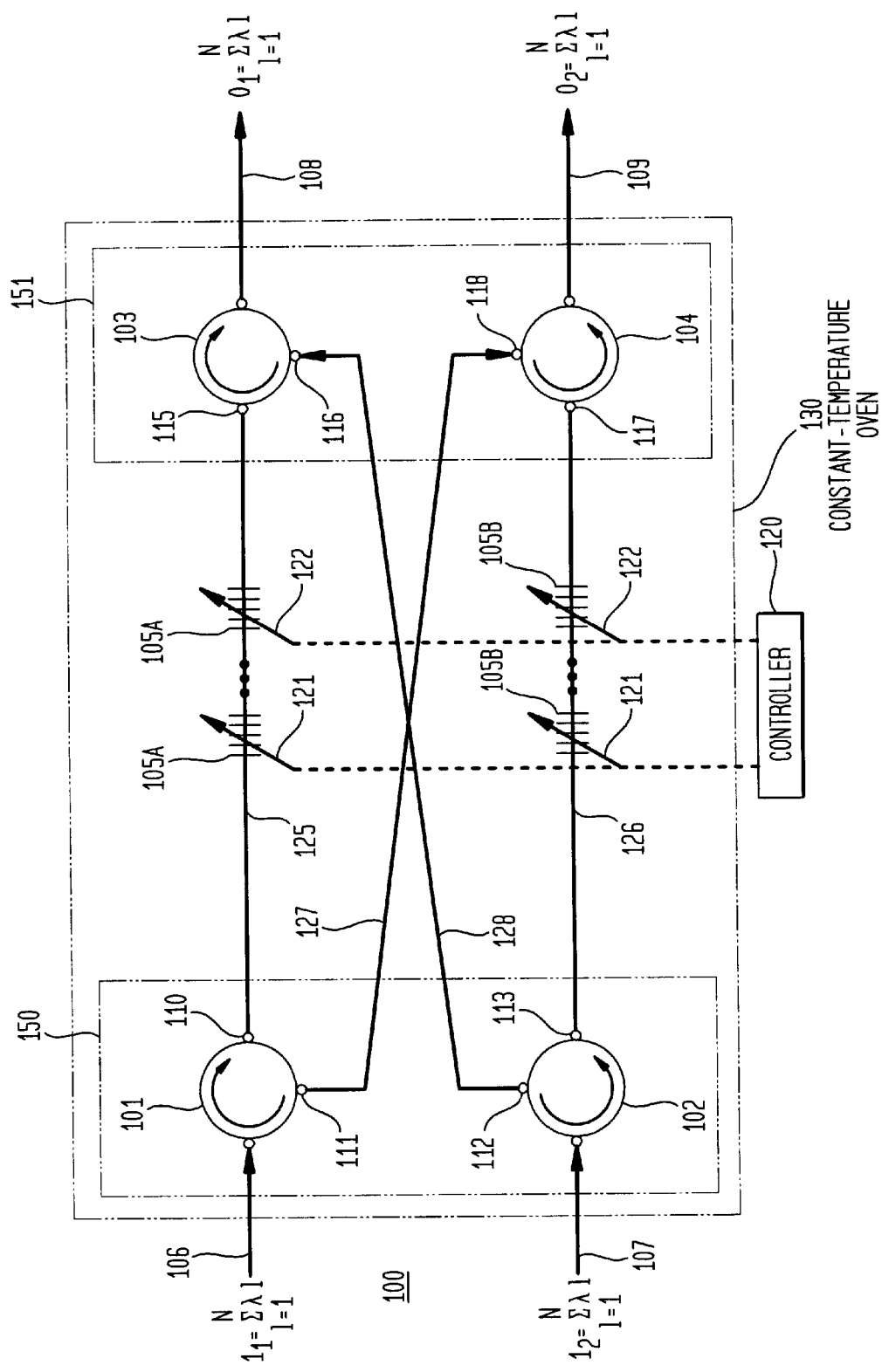
FIG. 11 shows a simple, low-cost and practical method to stabilize against ambient temperature fluctuations by packaging (a) the magnetically controllable gratings, or (b) the whole optical cross-connect system, in a single, constant-temperature oven.

1) Device system packaging that ensures no change in ambient temperature—For this, as shown in FIG. 11(a) all of the magnetically controllable gratings are conveniently packaged inside a single, constant temperature oven 130, e.g., operated at a fixed temperature of 40 degrees C. Or, as shown in FIG. 11(b), the whole optical cross-connect system can be placed in oven 130. Alternatively, all the gratings or the cross-connect system can be packaged in contact with or in the vicinity of a thermoelectric cooler (see articles by L. A. Johnson, *Lasers and Optoelectronics*, April, 1988, p. 109, and by J. R. Hobbs, *Laser Focus World*, February, 1993, P. 117) so that any desired temperature, e.g., zero degrees C., can be maintained. The use of temperature feedback and related temperature adjustment mechanism can conveniently be incorporated.

2) Device system packaging that provides a feedback on the state of the magnetically tuned grating wavelength when affected by ambient temperature change, and automatically corrects the wavelength to the right value for optical channel pass or reject. Optical spectrum analyzer or spectral tap device together with the signal feedback system that activates the needed magnetic pulse operation in the appropriate grating solenoids, and also optionally with temperature sensor, may be utilized. An additional advantage of such feedback system is that it provides a correction for all undesirable wavelength drift, e.g., caused by mechanical shock, creep deformation of packaging bond material such as epoxy, as well as the temperature dependent wavelength drift.

3) Device packaging that provides automatic (passive) temperature compensation in the magnetically tunable grating structure. Since the rise in the temperature of the grating results in the increase of the Bragg wavelength $\lambda$, primarily due to the temperature-dependent increase in $n_{eff}$, it is necessary to reduce the grating periodicity $\Lambda$ to compensate the effect and make $\lambda$ temperature-independent. This is accomplished, e.g., by initially pre-stressing the fiber grating, e.g., by tension, or by being in the magnetically strain tuned state and then causing the tension in the grating to become essentially proportionally relaxed as the ambient temperature is increased (or causing the tension to be stronger as the temperature is lowered). For typical silica-based optical fiber gratings with a germanium doped core, the extent of the required thermal contraction strain upon heating for maintaining the temperature-insensitive Bragg wavelength is about $900\times10^{-6}$ for a temperature change of 100° C., i.e., an effective CTE of about $-9\times10^{-6}$/° C.

This invention for imparting passive temperature-compensating capability to the tunable gratings (continuous and bistable configurations) is based on four types of mechanisms: (i) attaching the fiber grating to the mobile magnet via one or more components which have CTEs specifically chosen to reduce the tensile strain in the fiber grating and cancel out the temperature-induced increase in the resonant wavelength of the grating, (ii) the use of temperature-induced increase in the magnetic gap between mating magnetic poles, e.g., through the thermal expansion of the support frame onto which one of the magnetic components is attached, thereby reducing the magnetic force involved and hence the degree of elastic deformation in the fiber grating, (iii) the incorporation of at least one elongated element to attach the fiber grating to the guiding tube, as an extension and a strain relaxer by utilizing its thermal expansion to reduce the thermal strain in the attached grating, and (iv) the use of temperature-induced loss in magnetic strength of the programmable magnets, either by the intrinsic thermal scattering loss or by the incorporation of a thermally expanding gap material to increase the leakage flux and reduce the magnetic flux at the magnetic pole gap, thus reducing the magnetic attractive force, and hence the magnetically-induced tensile strain in the grating. It is to be noted that there are subtle differences in the manner in which the temperature-compensation can be achieved for the continuously-tunable and the bistable cases, with the former relying more on the altering of magnetic attractive force through control of gap or magnetic strength, and the latter directly on relaxing the strain in the fiber.

Figure 12A:
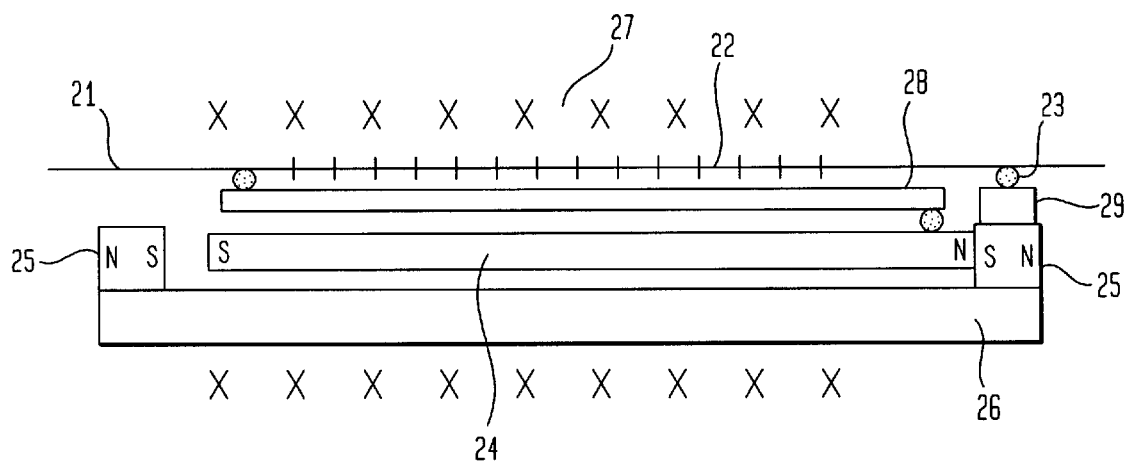
FIGS. 12(a)–(b) show a schematic illustration of a bistable, magnetically tunable grating device which is made temperature-insensitive by incorporating a negative thermal expansion element.

As an example, a passively temperature-compensated packaging for the bistable grating structure (magnetically switchable between two fixed grating wavelengths) is schematically illustrated in FIG. 12(a). Here, a negative-CTE element 20 is inserted and bonded between the fiber grating 22 and the mobile magnet 24 (which is programmable and latchable in its magnetization). The temperature compensating package needs to include a structure or a structural component the length of which contracts upon heating, i.e., with a net negative coefficient of thermal expansion (CTE). A material or an assembled structure with such a negative CTE value is therefore desirable as a temperature-compensating element in wavelength-tunable fiber gratings. Examples of desired negative CTE materials include: ceramic materials such as $ZrP_2O_7$, $ZrV_{2-x}P_xO_7$, and $ZrW_2O_8$ (See articles by C. Martinek et al., *J. Am. Ceram. Soc.*, Vol. 51, p. 227, 1968, T. A. Mary et al., *Science*, Vol. 272, p. 9, 1996, and V. Korthuis et al., *Chem. of Materials*, Vol. 7, p. 412, 1995). They also describe metallic negative CTE materials such as Ni—Ti alloys (with 48–64 wt % Ni), Cu—Al—Zn alloys (with 1–10% Al, 20–40% Zn, bal. Cu), Cu—Al—Ni alloys (10–20% Al, 1–5% Ni, bal. Cu), Cu—Zn—Si alloys (30–40% Zn, 0.5–1.5% Si, bal. Cu), and Cu-Sn alloys (20–30% Sn, bal. Cu) (see U.S. Patent Application Ser. No. 08/957,953 filed by D. A. Fleming on Oct. 27, 1997). The material chemistry and processing of metallic, ceramic, or composite materials can be controlled to obtain a desired level of the negative CTE.

The temperature-compensation effect in the device of FIG. 12(a) is obtained in the following manner. When the mobile magnet is switched to the right-side position against the right-side magnet 25 as in FIG. 12(a), the temperature effect is determined by two main factors, i.e., the temperature-induced wavelength increase in the grating and the thermal contraction of the negative-CTE element. The small distance between the two right-side bonds (consisting of a small portion of the length of the mobile magnet, a short length of the permanent magnet and of the pedestal 29) also contributes to thermal expansion, but its effect is small, and can be easily accommodated by adjusting the length or CTE of the negative-CTE element. By matching the negative CTE to the desired value of about −9 ppm/deg.C., a passive temperature-compensation effect is realized.

Figure 12B:
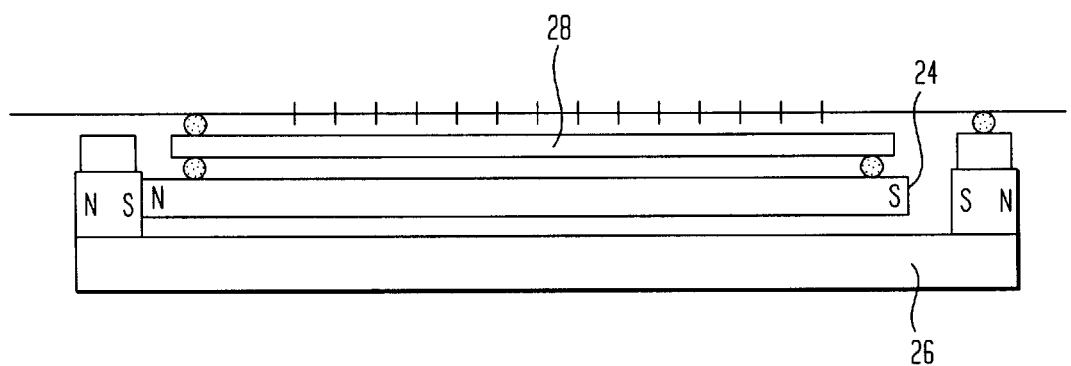

If the device of FIG. 12(*a*) is now switched to the higher wavelength state shown in FIG. 12(*b*), the mobile magnet is magnetically attached to the left-side permanent magnet. In this state, the thermal expansions of both the programmable magnet and the support frame participate in the temperature-effect and influence the tensile strain and the grating wavelength. The present invention calls for the use of CTE-matching of the programmable magnet 24 and the support frame 26 (with a minor adjustment to accommodate other small components, length differentials etc.), in which case, the thermal expansion effects due to the zigzag-positioned programmable magnet and the support frame are cancelled out. Instead of a single negative-CTE element, a negative CTE composite comprising three, positive- or zero-CTE materials placed in a compact zigzag configuration can replace the one negative CTE element in FIG. 12. The effective thermal contraction on heating is obtained by utilizing a differential CTE of two linear bodies in a parallel configuration attached onto a third linear body.

It will be understood that the particular embodiments described above are only illustrative of the principles of the invention, and that various modifications could be made by those skilled in the art without departing from the spirit and scope of the invention. For example, it should be noted that there are several suitable material systems that can be used for implementing the preceding embodiments including, but not limited to, lithium niobate, silicon optical bench, semiconductor systems, and the like. Because these examples are illustrative and not limiting, various modifications to the embodiments are contemplated by the teachings of the invention. Accordingly, the scope of the present invention is limited only by the claims that follow.

What is claimed is:

1. A controllable, wavelength-selectable, optical cross-connect switch including a plurality of input ports for receiving multi-wavelength optical signals and a plurality of output ports for supplying multi-wavelength optical signals as outputs from the optical switch, each multi-wavelength optical signal including a plurality of channels wherein a channel is associated with a particular wavelength, the optical switch further comprising:

an optical router portion coupled to the plurality of input ports for distributing the multi-wavelength optical signals from the input ports;

an optical combiner portion coupled to the plurality of output ports for combining the multi-wavelength optical signals; and a plurality of optical fibers interconnecting the optical router portion and the optical combiner portion, selected ones of the plurality of optical fibers including wavelength-selective magnetically tunable fiber gratings with two selectable bi-stable states, capable of passing or reflecting any of the plurality of channels so that any of the plurality of channels can be supplied from any of the plurality of input ports to any of the plurality of output ports.

2. The optical cross-connect switch according to claim 1, wherein the wavelength-selective elements comprise fiber Bragg gratings the wavelength of which is magnetically alterable.

3. The switch of claim 1 wherein the tuning is carried out by using magnetic force interaction of adjacent magnetic poles.

4. The switch of claim 1 wherein the wavelength selection is latchable after the actuation and no further power is needed to maintain the selected wavelength.

5. The switch of claim 2 wherein the wavelength selection is done by choosing a desired wavelength from a continuous spectrum of wavelength through magnetic actuation with desired magnetic field strength.

6. The switch of claim 1 wherein the wavelength selection is done by choosing a desired wavelength from digitally available wavelengths pre-set in the design and assembly of the fiber grating structure.

7. The switch of claim 1, wherein the optical router portion includes a plurality of input optical couplers, each input optical coupler associated with a corresponding one of the plurality of input ports, and wherein the optical combiner portion includes a plurality of output optical couplers, each output optical coupler associated with a corresponding one of the plurality of output ports.

8. The switch of claim 7, wherein the plurality of input optical couplers and the plurality of output optical couplers comprise star couplers.

9. The switch of claim 8, wherein each of the plurality of input optical couplers is a 1×M optical coupler and each of the plurality of output optical couplers is a K×1 optical coupler, where K is an integer corresponding to the number of input ports and M is an integer corresponding to the number of output ports, and wherein each multi-wavelength optical signal comprises N channels, and the multi-wavelength optical signals having N channels are routed between the K input ports and the M output ports in a K×M cross-connect configuration.

10. The switch of claim 9, wherein K=M.

11. The switch of claim 1, further comprising a controller responsive to command signals for selectively controlling the tunable fiber gratings to reflect or pass any of the plurality of channels.

12. The switch of claim 11, wherein the fiber gratings are magnetically tunable fiber gratings and wherein the controller selectively tunes the fiber gratings by applying a magnetic field.

13. The switch of claim 11, wherein the controller selectively switches the fiber gratings between a transmissive and a reflective operational state.

14. The switch of claim 11, wherein selected ones of the fiber gratings are controlled as a group.

15. The switch of claim 11, wherein each of the fiber gratings is individually controllable.

16. The switch of claim 1 wherein the optical cross-connect switch is contained in a temperature compensating package so that the switch performance is independent of ambient temperature.

17. The switch of claim 16 wherein the non-dependency on ambient temperature is accomplished by providing at least one constant temperature oven which houses the optical cross-connect.

18. The switch of claim 16 wherein the non-dependency on ambient temperature is accomplished by providing at least one thermoelectric cooler in the vicinity of the cross-connect.

19. The switch of claim 16 wherein the non-dependency on ambient temperature is accomplished by providing a wavelength detection and feedback system, and by actively readjusting the wavelengths of the tunable gratings by magnetic pulse actuation.

20. The switch of claim 7, wherein the plurality of input optical couplers and the plurality of output optical couplers each include previously unused ports capable of selectively adding individual channels of particular wavelengths to the multi-wavelength optical signals.

21. The switch of claim 7, wherein the plurality of input optical couplers and the plurality of output optical couplers each include previously unused ports capable of selectively dropping individual channels of particular wavelengths from the multi-wavelength optical signals.

22. The switch of claim 7, further comprising a rare earth-doped fiber amplifier coupled to each of the plurality of input optical couplers for optically amplifying the multi-wavelength optical signal received by the corresponding one of the plurality of input optical couplers.

23. The switch of claim 7, further comprising a plurality of rare earth-doped fiber amplifiers coupled respectively to each of the plurality of output optical couplers for optically amplifying the multi-wavelength optical signal supplied by the corresponding one of the plurality of output optical couplers.

24. The switch of claim 7, further comprising a plurality of rare earth-doped fiber amplifiers coupled within selected ones of the plurality of optical fibers having wavelength-selective elements, each of the rare earth-doped fiber amplifiers optically amplifying the multi-wavelength optical signals between the plurality of input optical couplers and the plurality of output optical couplers.

25. An optical cross-connect comprising:
  at least two input directional optical transfer devices each capable of receiving multi-wavelength optical signals, each multi-wavelength optical signal including a plurality of channels wherein a channel is associated with a particular wavelength;
  at least two output directional optical transfer devices each capable of supplying the multi-wavelength optical signals as outputs from the optical cross-connect; and
  a plurality of optical fibers interconnecting the at least two input directional optical transfer devices and the at least two output directional optical transfer devices, selected ones of the plurality of optical fibers including at least one magnetically controllable wavelength-selective element with two selectable bi-stable states, capable of passing or reflecting any of the plurality of channels so that any of the plurality of channels can be routed from any of the at least two input directional optical transfer devices to any of the at least two output directional optical transfer devices.

26. The cross-connect of claim 25, wherein the wavelength-selective elements comprise magnetically tunable and latchable fiber gratings.

27. The cross-connect of claim 25, wherein the at least two input directional optical transfer devices and the at least two output directional optical transfer devices each comprise an optical circulator.

28. The cross-connect of claim 25, wherein the at least two input directional optical transfer devices and the at least two output directional optical transfer devices each comprise an optical coupler.

29. The cross-connect of claim 26, further comprising a controller responsive to command signals for selectively controlling the magnetically tunable fiber gratings to reflect or pass any of the plurality of channels.

30. The cross-connect of claim 29, wherein the fiber gratings are tunable fiber gratings and wherein the controller selectively tunes the fiber gratings by applying a magnetic pulse field.

31. The cross-connect of claim 29, wherein the controller selectively switches the fiber gratings between a transmissive and a reflective operational state.

32. The cross-connect of claim 29, wherein selected ones of the fiber gratings are controlled as a group in a ganged arrangement.

33. The cross-connect of claim 29, wherein each of the fiber gratings is individually controllable.

34. The cross-connect of 16 wherein the temperature-dependent wavelength changes in the optical cross-connect switch are less than 0.5 nm/100 deg.C.

* * * * *